(12) United States Patent
Shiraishi et al.

(10) Patent No.: US 6,431,872 B1
(45) Date of Patent: Aug. 13, 2002

(54) DRIVE SIMULATION APPARATUS

(75) Inventors: Shuji Shiraishi; Yuichi Hashimoto; Yutaka Nishi; Mitsuya Serizawa, all of Tochigi-ken; Osamu Yamamoto; Takashi Nishihara, both of Utsunomiya; Hiroyuki Kawagoe, Tochigi-ken; Nobuharu Kuriki, Tochigi-ken; Takuya Sakai, Tochigi-ken; Hidenori Ishihama, Utsunomiya; Toyotaka Torii, Asaka; Akihiko Ohtsu, Kamifukuoka, all of (JP)

(73) Assignee: Honda Kigen Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/457,707

(22) Filed: Dec. 10, 1999

(30) Foreign Application Priority Data

| Dec. 25, 1998 | (JP) | 10-371673 |
| Jan. 14, 1999 | (JP) | 11-008342 |
| Jan. 14, 1999 | (JP) | 11-008353 |
| Jan. 14, 1999 | (JP) | 11-008363 |
| Jan. 14, 1999 | (JP) | 11-008377 |
| Mar. 19, 1999 | (JP) | 11-076826 |
| Mar. 19, 1999 | (JP) | 11-076829 |
| Mar. 19, 1999 | (JP) | 11-076860 |
| Apr. 5, 1999 | (JP) | 11-097786 |
| Apr. 7, 1999 | (JP) | 11-100299 |

(51) Int. Cl.⁷ ............................................. G09B 9/05
(52) U.S. Cl. ..................... 434/69; 434/29; 434/55; 434/62; 463/46; 703/8; 273/442
(58) Field of Search ................. 434/29, 30, 38, 434/44, 45, 46, 55, 58, 59, 61, 62, 64, 65, 67, 69, 71, 307 R, 308, 372, 373, 365; 463/6, 35, 36, 39, 46, 42; 472/60, 61, 130; 73/117; 348/51, 121, 208; 345/8, 7, 145; 244/190; 273/148 B, 442; 703/7, 8; 701/2

(56) References Cited

U.S. PATENT DOCUMENTS

| 4,464,117 A | * | 8/1984 | Foerst ........................ 434/67 |
| 4,710,128 A | * | 12/1987 | Wachsmuth et al. .......... 434/46 |
| 4,750,888 A | * | 6/1988 | Allard et al. ................. 434/69 |
| 4,817,948 A | * | 4/1989 | Simonelli ...................... 463/6 |
| 5,192,247 A | * | 3/1993 | Barr et al. .................... 472/60 |
| 5,277,584 A | * | 1/1994 | DeGroat et al. .............. 434/29 |
| 5,366,376 A | * | 11/1994 | Copperman et al. ......... 434/69 |
| 5,490,784 A | * | 2/1996 | Carmein ....................... 434/55 |
| 5,547,382 A | * | 8/1996 | Yamasaki et al. ............. 434/61 |
| 5,707,237 A | * | 1/1998 | Takamoto et al. ............ 434/69 |
| 5,865,624 A | * | 2/1999 | Hayashigawa ............... 434/66 |
| 5,908,300 A | * | 6/1999 | Walker et al. .............. 434/473 |
| 5,921,780 A | * | 7/1999 | Myers .......................... 434/69 |
| 6,044,696 A | * | 4/2000 | Spencer-Smith ............. 73/117 |
| 6,053,815 A | * | 4/2000 | Hara et al. .................... 434/46 |

FOREIGN PATENT DOCUMENTS

| JP | 7-234628 | 9/1995 |
| JP | 8-248872 | 9/1996 |

* cited by examiner

Primary Examiner—Joe H. Cheng
(74) Attorney, Agent, or Firm—Arent Fox Kintner Plotkin & Kahn, PLLC

(57) ABSTRACT

A cockpit is supported by a motion base in a state of being capable of making swinging movement. A host computer calculate vehicle motion information in accordance with operation of various operation equipments performed by a driver accommodated in the cockpit. A simulation image is formed, the cockpit is controlled for swinging movement, and various meters or the like in the cockpit are controlled on the basis of an obtained result of the calculation. Thus, the drive simulation is carried out in a state approximate to that of a real vehicle.

28 Claims, 19 Drawing Sheets

F I G. 21
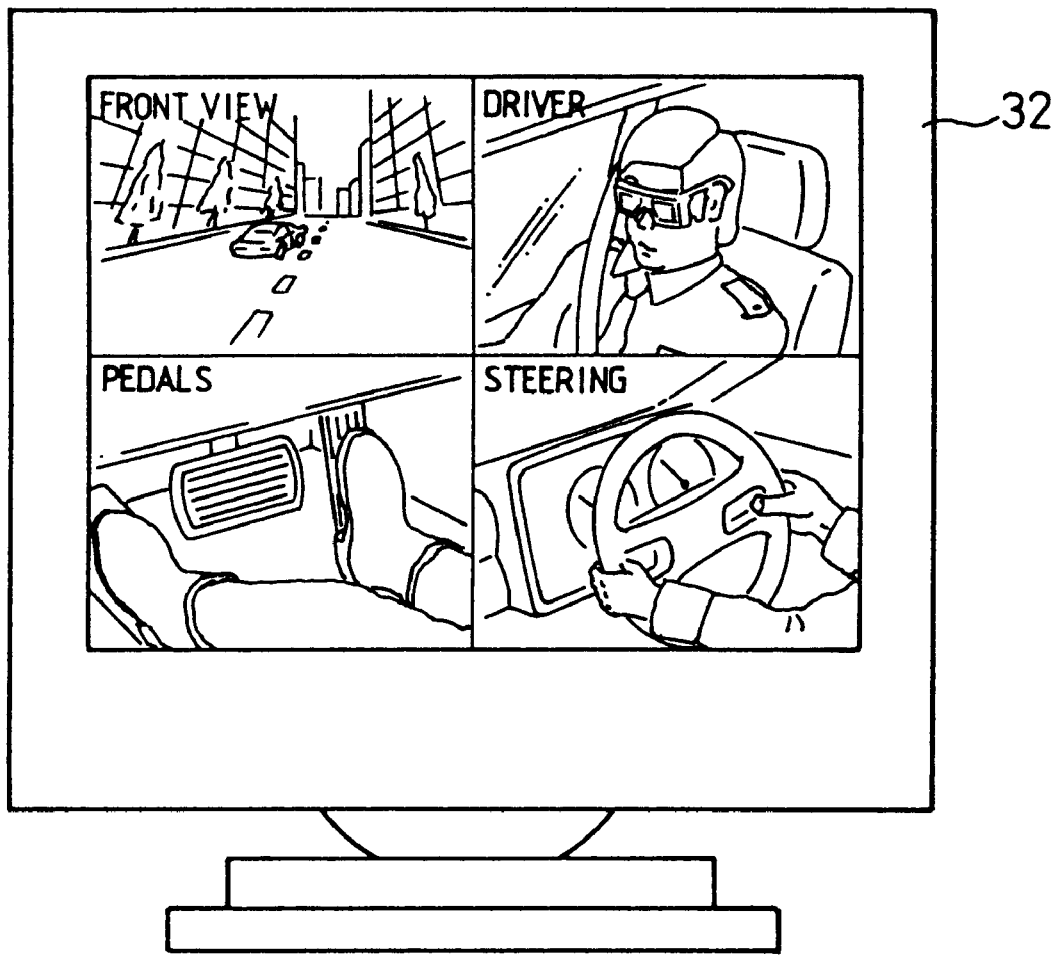

DRIVE SIMULATION APPARATUS

BACKGROUND OF THE INVENTION

1. Field of the Invention

The present invention relates to a drive simulation apparatus which is constructed such that the swinging movement of a motion base is controlled, and a simulation image, which is formed on a screen in front of a cockpit, is controlled in accordance with operation of a driver in the cockpit which is installed on the motion base.

2. Description of the Related Art

A drive simulation apparatus has been hitherto known as an apparatus to be utilized, for example, for skill training for drivers and for research and development of automobiles. Such a drive simulation apparatus basically comprises a cockpit for seating a driver to perform various operations, a screen for displaying a scene including a driving road and objective vehicles in front of the driver by using computer graphics, a motion base for supporting the cockpit and swinging the cockpit in accordance with the operation of the driver, and a control unit for controlling the above (see Japanese Laid-Open Patent Publication No. 8-248872).

In such a drive simulation apparatus, it is demanded that the driver is able to physically feel an operation feeling and driving situations which are more approximate to those obtained by a real vehicle.

In order to realize such a demand, for example, it is necessary that the information on the operation of the driver is transmitted In detail to the external control unit, and the motion base is operated, on the basis of the transmitted information, In a state similar to a real vehicle as approximately as possible. It is also necessary that an appropriate image is displayed, on the basis of the operation information of the driver, on the screen which is disposed in front of the driver. The drive simulation apparatus does not run on an actual road surface. Therefore, for example, it is necessary that a steering wheel is controlled by the external control unit in accordance with the operation information in order to apply a virtual reaction force to the steering wheel.

In such a drive simulation apparatus, a large number of operation equipments to be operated by the driver are arranged in the cockpit, including, for example, the steering wheel, a brake pedal, an accelerator pedal, a shift lever, and a head light switch. A large number of wirings are required in order that signals from the operation equipments are transmitted to the external control unit, or control signals are transmitted from the control unit to an electric power steering unit.

However, the cockpit, which is connected to the external control unit via the large number of wirings, makes swinging movement considerably strongly during the operation. Therefore, it is feared that the presence of the large number of wirings causes any trouble such as disconnection. In order to prevent any accident such as disconnection beforehand, for example, it is necessary that the wiring is made thick, or the wiring itself is supported by a swingable mechanism. However, if such a countermeasure is adopted, the cost of the entire apparatus is consequently increased. On the other hand, if the number of wirings is decreased in order to avoid disconnection or the like, the amount of controllable information is decreased. As a result, it is difficult to control the cockpit in a state approximate to a real vehicle. Therefore, it is impossible to perform any appropriate simulation.

The motion base comprises a plurality of actuators composed of, for example, hydraulic cylinders or electric cylinders in order to allow the cockpit to make pitching, rolling, and yawing actions. However, in order to obtain an action range of the cockpit approximate to that of a real vehicle, it is necessary to sufficiently ensure the stroke of each of the actuators. However, if it is intended to ensure a sufficient stroke, then the motion base inevitably has a large size, and the entire apparatus has a large size as well.

In order to create the road surface reaction force and obtain the same steering feeling as that of a real vehicle by using the steering unit of the drive simulation apparatus which involves neither road surface nor tire, it is conceived that an actuator such as an electric motor is attached to a steering shaft to give a steering reaction force in a simulated manner (see Japanese Laid-Open Patent Publication No. 7-234628). However, in order to obtain the same steering reaction force as that actually obtained, it is necessary to perform complicated control considering, for example, the friction of the steering system. Therefore, the cost becomes expensive as well.

On the other hand, when the same components as those used in a real vehicle are used for the steering wheel, the brake pedal, the power window, the air conditioner, other operation equipments, and meters which are arranged in the cockpit, then an obtained apparatus is advantageous in cost, and such an apparatus makes it possible to physically feel driving situations which are more approximate to those obtained by the real vehicle.

In the case of a real vehicle, an electric equipment system concerning the operation equipments and the meters is usually driven by DC 12 V which is supplied by being generated by an engine. However, in the case of a drive simulation apparatus, no engine is carried for the purpose of power generation. The drive simulation apparatus is used in a state of being fixed in a room. Therefore, the necessary electric power is acquired from a commercial AC power source. The alternating current, which is supplied from the commercial AC power source, is converted by an AC-DC converter into a direct current which is supplied to the electric equipment system concerning the respective operation equipments. However, such an electric equipment system requires large electric current consumption in some cases. For example, the electric power steering unit, which generates the reaction force for the steering operation by driving an electric power steering-driving motor, is connected to the steering wheel. Further, an ABS unit, which performs ABS control for the brake by driving an antilock braking system (ABS)-driving motor, is connected to the brake pedal. Such an electric equipment system requires a large current when the steering wheel is rotated, or when the ABS unit is operated as a result of the use of heavy braking. In addition, an electric equipment system, which is driven in accordance with the operation of the driver and which consumes a large current, is provided in the cockpit, including, for example, the electric window and the air conditioning fan.

An AC-DC converter having a large capacity is required to simultaneously drive the electric equipment systems by using the alternating current supplied from the commercial AC power source. In this context, some of the electric equipment systems, which require large electric current consumption as described above, are not always driven, however, they are driven simultaneously in some cases.

However, if an AC-DC converter having a large capacity is introduced only for such a purpose, the cost of the drive simulation apparatus is increased. Further, an inconvenience arises, which results in the increase in weight and the increase in size.

It is clear for the drive simulation apparatus that the reality is further improved if a real image is displayed on the screen. For example, a situation is assumed in which the simulation is performed for an emergency vehicle. The running condition of neighboring other vehicles is different between a case in which the emergency vehicle runs in a state in which the siren is sounded, and a case in which the emergency vehicle runs in a state in which the siren is not sounded. Further, the drive simulation apparatus should be designed such that when the driver sounds a horn, a leading vehicle avoids the subjective vehicle.

However, the conventional apparatus is constructed such that although the image is changed depending on, for example, the steering operation, the braking operation, and the accelerator operation of the driver, the image is not changed by any operation other than the above.

In the case of a real vehicle, the swinging center is located at the center of gravity of the vehicle. On the contrary, in the case of the drive simulation apparatus, the swinging center is set on the side of the motion base in some cases. If the simulation is performed in such a state, the head of the driver is greatly separated from the swinging center. Therefore, especially when an action, which accompanies large acceleration or deceleration, is continued, the difference from the real vehicle is increased. Further, the driver occasionally suffers from so-called simulator motion sickness.

In a conventional technique disclosed in Japanese Laid-Open Patent Publication No. 8-248872, the control is made such that the point of swinging center approaches the head of the driver, as the acceleration or the deceleration of the cockpit is increased. By doing so, the discomfort feeling of the driver is mitigated.

However, when the action of the cockpit is controlled as described above, although the discomfort feeling is mitigated, it is feared that the driving feeling, which would be obtained in response to the action of a real vehicle, cannot be obtained in some situations.

Further, it is clear that such a drive simulation apparatus fails to achieve the sufficient leaning of skill and the sufficient research and development, if it is used in a form of use in which the driving technique is intended to be improved or the research and development are made by only the driver. In other words, for example, in order to improve the driving technique, it is indispensable to make appropriate monitoring and instruction by a skillful instructor. For the purpose of the research and development, it is clear that the work should be carried out by a plurality of researchers in cooperation with each other.

However, in the case of the conventional drive simulation apparatus, it is impossible for an external person to easily recognize, for example, the operation state of the various operation equipments operated by the driver. Therefore, a situation arises, in which the drive simulation apparatus cannot be utilized effectively.

Further, it is indispensable for the drive simulation apparatus to possess an emergency stop function. For example, if the control unit is erroneously operated due to any influence, it is impossible to deny the possibility that the swinging action of the motion base may be abnormal. For example, a situation may occur, in which the driver feels sick, and the driver himself desires the stop of simulation in some cases.

In order to respond to such situations, for example, it is easily conceived that the power source, which is used to supply the electric power to the entire drive simulation apparatus, is cut off by using a power source-interrupting device (breaker).

However, if the motion base is stopped by using the power source-interrupting device as described above, the control unit for constructing the drive simulation apparatus is also shut down. Therefore, for example, it is feared that the set data and the program may be destroyed.

The motion base makes it possible for the driver to physically feel the simulation state approximate to a real vehicle by the aid of the swinging action thereof. However, it is almost impossible for the driver to correctly recognize an actual operation state of the drive simulation apparatus as viewed from the outside. Therefore, for example, assuming a case in which the operation in the cockpit is abnormal, it is necessary to provide a system in which the operator always monitors the operation state from the outside. Further, there is a possibility that the motion base is out of order. If no countermeasure is made for such a situation, it is impossible to use the drive simulation apparatus for a long period of time.

SUMMARY OF THE INVENTION

A general object of the present invention is to provide a drive simulation apparatus which makes it possible to perform simulation in a state approximate to a real vehicle.

A principal object of the present invention is to provide a drive simulation apparatus which makes it possible to avoid occurrence of any inconvenience such as disconnection, send and receive a large amount of information between a cockpit for accommodating a driver and an external host computer, and perform simulation in a state approximate to a real vehicle.

Another object of the present invention is to provide a drive simulation apparatus which can be constructed to have a compact size and which makes it possible to realize a sufficient simulation action within a necessary and minimum movable range.

Still another object of the present invention is to provide a drive simulation apparatus which can be effectively utilized and which makes it possible to sufficiently contribute, for example, to the improvement in driving technique and the quick advance of research and development.

Still another object of the present invention is to provide a drive simulation apparatus which has a compact size, which is inexpensive, and which can be driven with sufficient electric power.

Still another object of the present invention is to provide a drive simulation apparatus which makes it possible to obtain a steering feeling equivalent to that obtained by a real vehicle.

Still another object of the present invention is to provide a drive simulation apparatus which makes it possible to perform simulation by using appropriate condition setting in response to operation of a driver.

Still another object of the present invention is to provide a drive simulation apparatus which makes it possible to perform simulation by arbitrarily selecting whether or not a motion base is operated.

Still another object of the present invention is to provide a drive simulation apparatus which sufficiently ensures a movable range and which makes it possible to apply a yawing action approximate to a real vehicle to a cockpit, without enlarging or complicating the apparatus.

Still another object of the present invention is to provide a drive simulation apparatus which makes it possible to realize a swinging action and a driving feeling approximate to those obtained by a real vehicle and which makes it possible to avoid any simulator motion sickness.

Still another object of the present invention is to provide a drive simulation apparatus which makes it possible to stop an action of a motion base easily and reliably without destroying, for example, data and programs.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 21 illustrates a monitoring screen displayed on a display for an operator.

DESCRIPTION OF THE PREFERRED EMBODIMENTS

Figure 1:
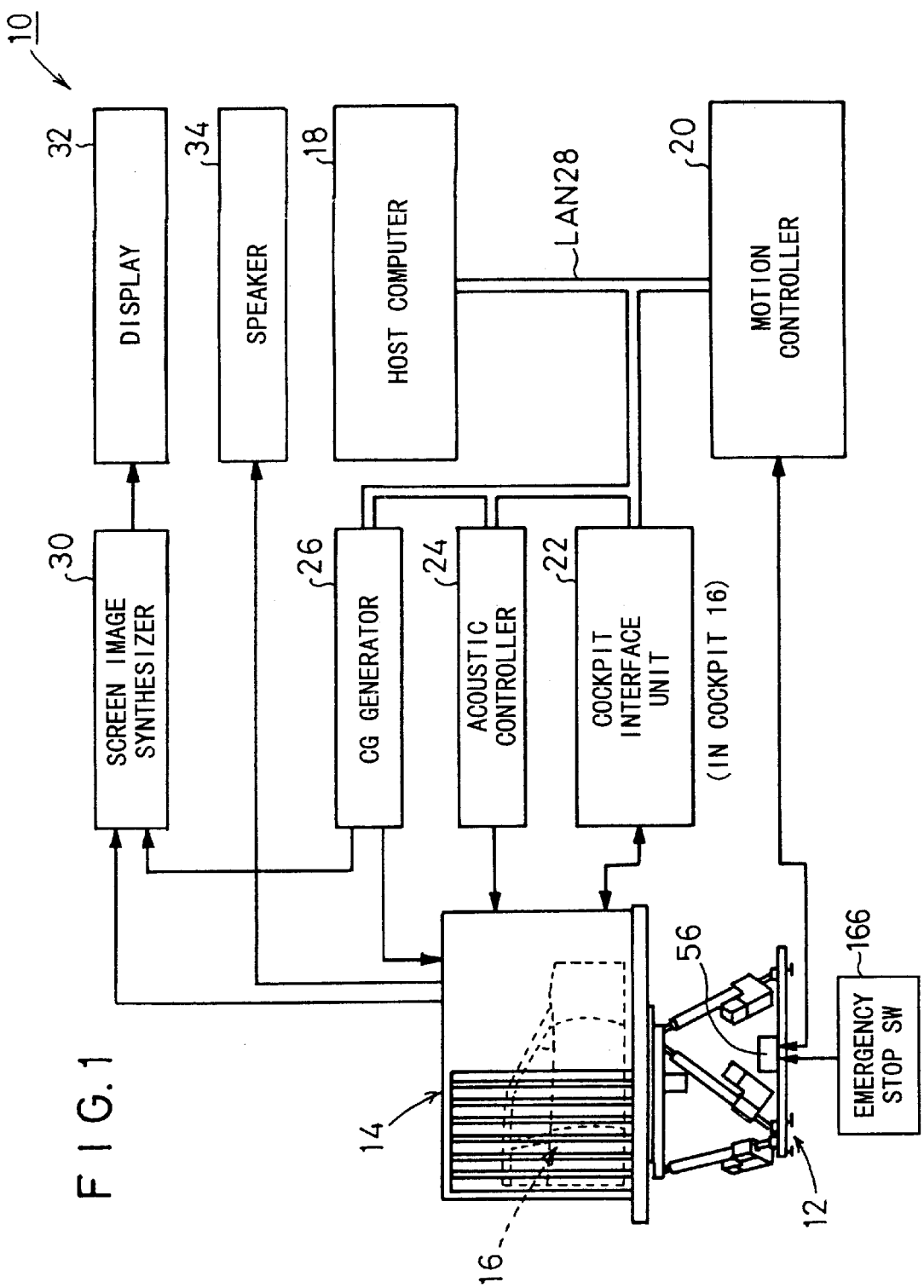
FIG. 1 shows a block diagram illustrating an overall arrangement of a drive simulation apparatus.

FIG. 1 shows a drive simulation apparatus 10 according to an embodiment of the present invention. The drive simulation apparatus 10 comprises a motion base 12, a cabin 14 which is placed on the motion base 12, and a cockpit 16 which is accommodated in the cabin 14.

The overall operation of the drive simulation apparatus 10 is controlled by a host computer 10. A motion controller 20 for controlling swinging movement of the motion base 12 on the basis of operation of a driver, a cockpit interface unit 22 for sending and receiving a large number of signals between the host computer 18 and various operation equipments in the cockpit 16, an acoustic controller 24 for providing a virtual sound effect during running to the driver, and a CG generator 26 (image-forming means) for providing a simulation image including a driving road and objective vehicles to the driver by using computer graphics are connected to the host computer 18 via LAN (Local Area Network) 28 which serves as a network circuit. A screen image synthesizer 30 for synthesizing a plurality of screen images concerning the simulation is connected to the cockpit 16. A screen image, which is synthesized by the screen image synthesizer 30, is displayed on a display 32 of an operator. The screen image synthesizer 30 and the display 32 constitute an image-synthesizing and displaying means. A speaker 34, which is arranged on the side of the host computer 18, is connected to the cockpit 16. The voice of the driver is transmitted to the operator by using the speaker 34.

Figure 2:
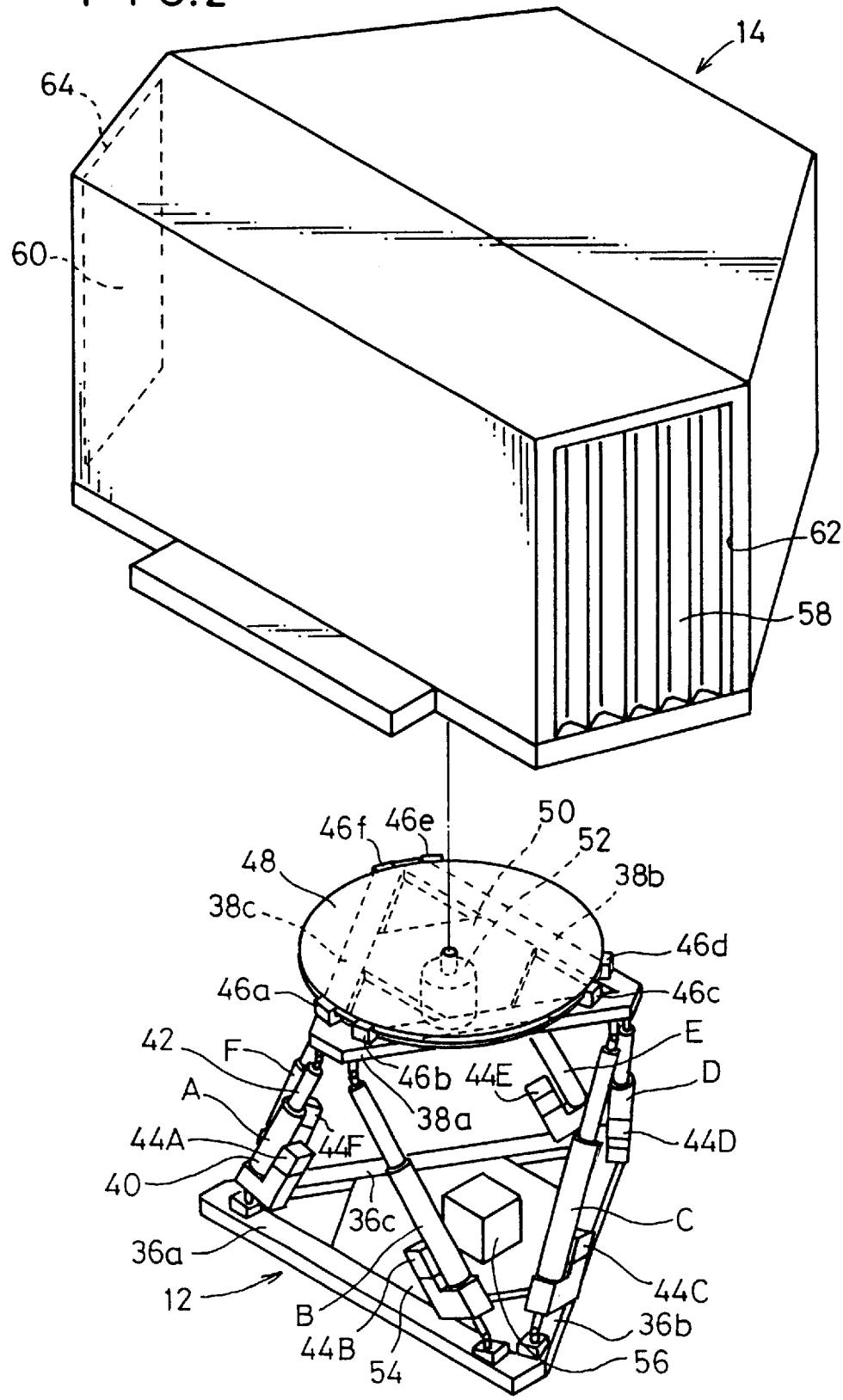
FIG. 2 shows an exploded perspective view illustrating a motion base and a cabin.

As shown in FIG. 2, the motion base 12 comprises three lower support bars 36a to 36c which are connected in a triangular configuration, three upper support bars 38a to 38c which are connected in a triangular configuration, and six cylinders A to F for connecting the lower support bars 36a to 36c and the upper support bars 38a to 38c. The cylinders A to F are composed of ball screw mechanisms for connecting respective apexes of a triangle formed by the lower support bars 36a to 36c and respective apexes of a triangle formed by the upper support bars 38a to 38c. That is, each of the cylinders A to F comprises a cylindrical section 40 which is swingably connected to the side of the lower support bars 36a to 36c, and a rod section 42 which is inserted into the cylindrical section 40 and which is swingably connected to the side of the upper support bars 38a to 38c. An unillustrated male screw is formed on the outer circumference of the rod section 42 on the side of the lower support bars 36a to 36c. The male screw is engaged with an unillustrated female screw member which is arranged in the cylindrical section 40. The female screw member is arranged to be rotatable by the aid of a cylinder-driving motor 44A to 44F which is installed to the outer circumference of the cylindrical section 40.

The cylinder A to F is provided with an unillustrated brake mechanism. When the electric power is supplied to the cylinder-driving motor 44A to 44F, the brake mechanism is turned OFF to enable the operation of the rode section 42. When the electric power is not supplied, the brake mechanism is turned ON to disable the operation of the rod section 42.

Guide brackets 46a to 46f are fixed on an identical circumference on upper portions of the upper support bars 38a to 38c. A rotary table 48 is rotatably supported by the guide brackets 46a to 46f. A table-driving motor 52 is installed on the lower surface of the rotary table 48 via an installation plate 50 which is installed to central portions of the upper support bars 38a to 38c.

A motor driver 56 is arranged via an installation table 54 at a central portion of the lower support bars 36a to 36c. The motor driver 56 controls the driving operation of the cylinder-driving motors 44A to 44F and the table-driving motor 52. An emergency stop switch 166 is connected to the motor driver 56, which serves as a stop means for cutting off the electric power to be supplied to the cylinder-driving motors 44A to 44F and the table-driving motor 52 and turning ON the brake mechanism provided for the cylinders A to F so that the operation of the motion base 12 is stopped (see FIGS. 1 and 15).

Figure 3:
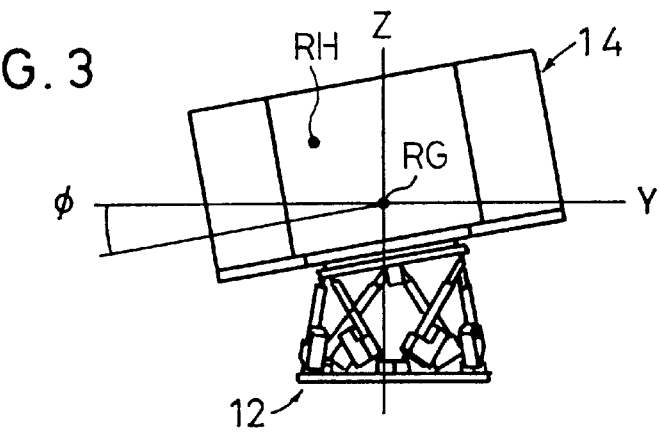
FIG. 3 illustrates the roll of the cabin.
Figure 4:
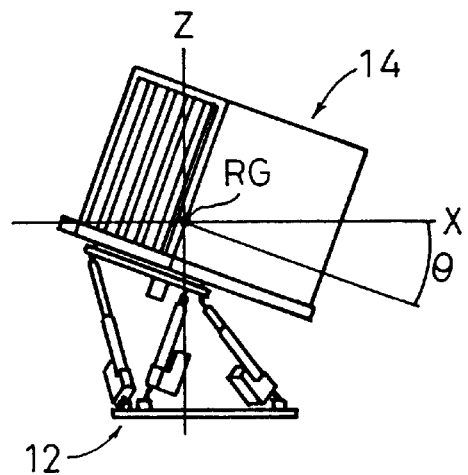
FIG. 4 illustrates the pitch of the cabin.
Figure 5:
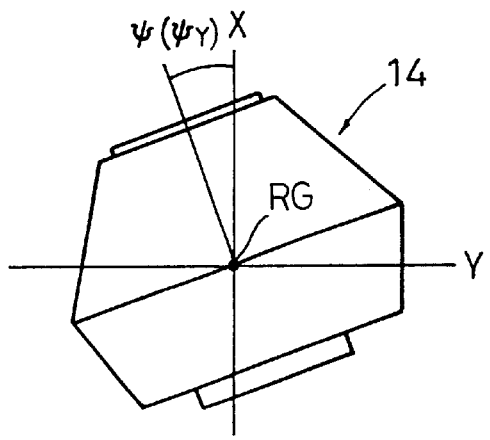
FIG. 5 illustrates the yaw of the cabin.

The cabin 14, which is arranged on the motion base 12, is rotatably supported by the rotary table 48 which is installed to the motion base 12. That is, as shown in FIGS. 3 to 5, the cabin 14 is swingable by the roll angle φ, the pitch angle θ, and the yaw angle ψ about the respective axes of X, Y, Z by the aid of the respective cylinders A to F which constitute the motion base 12. Further, the cabin 14 is swingable by the yaw angle $\psi_Y$ about the Z axis by the aid of the rotary table 48. The cabin 14 is also movable in the respective directions, i.e., frontwardly, backwardly, leftwardly, rightwardly, upwardly, and downwardly. FIGS. 3 to 5 are illustrative of a case in which the central point of the swinging movement of the cockpit 16 is set to be located at a point RG which corresponds to the position of the center of gravity of the vehicle.

Figure 6:
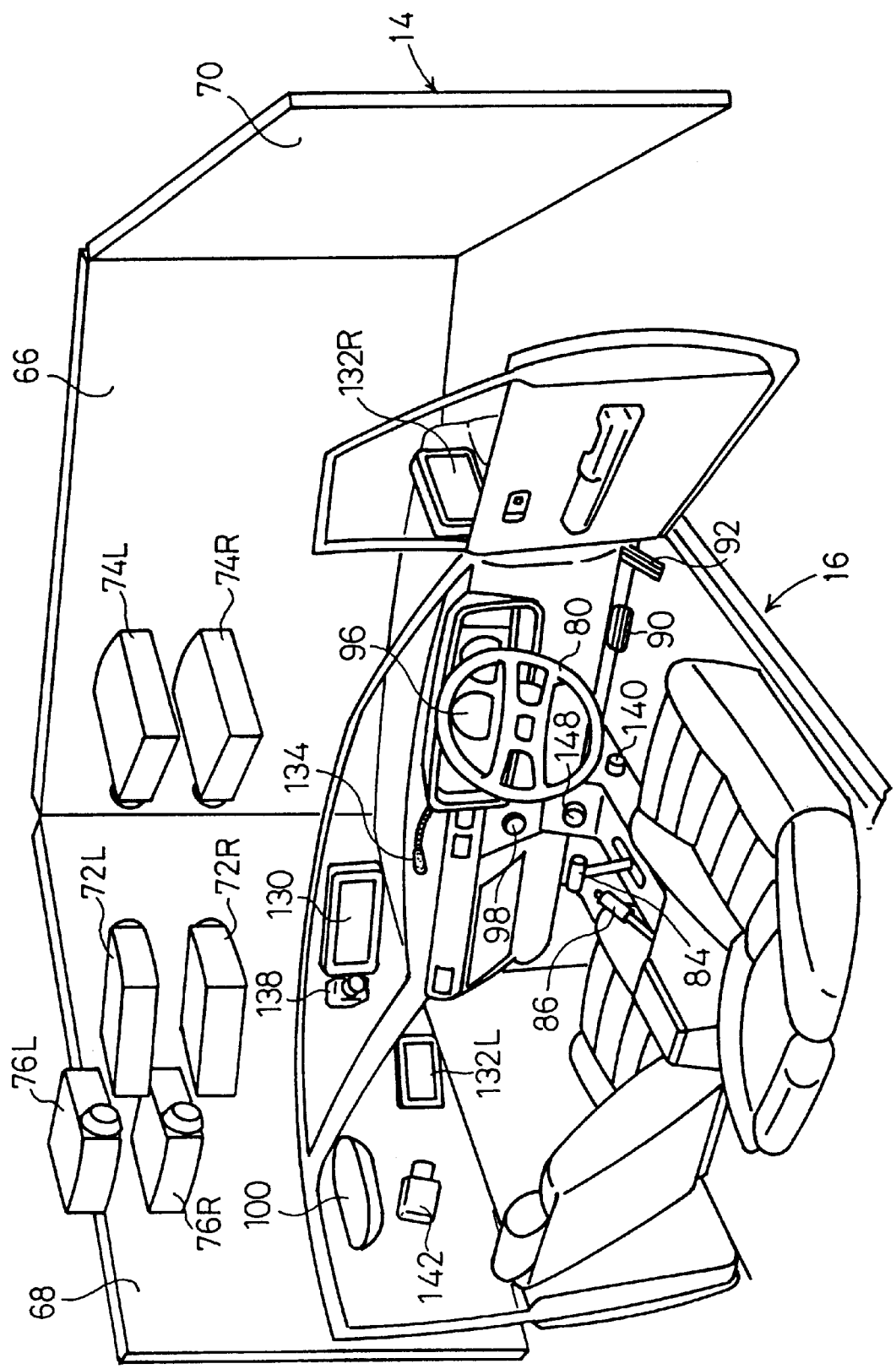
FIG. 6 shows a perspective view illustrating an arrangement of a cockpit disposed in the cabin.
Figure 7:
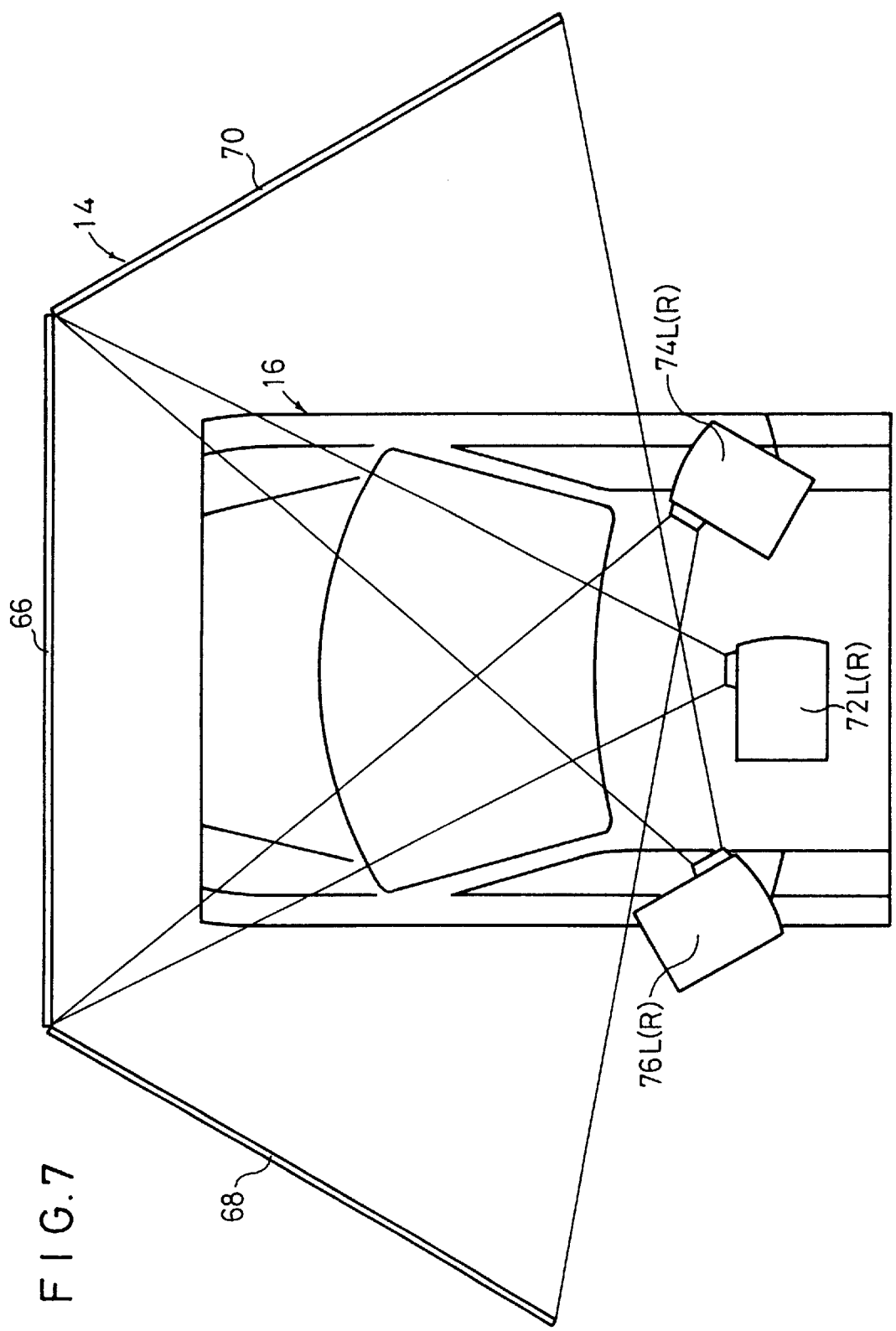
FIG. 7 shows a plan view illustrating an arrangement of projector disposed in the cabin.
Figure 8:
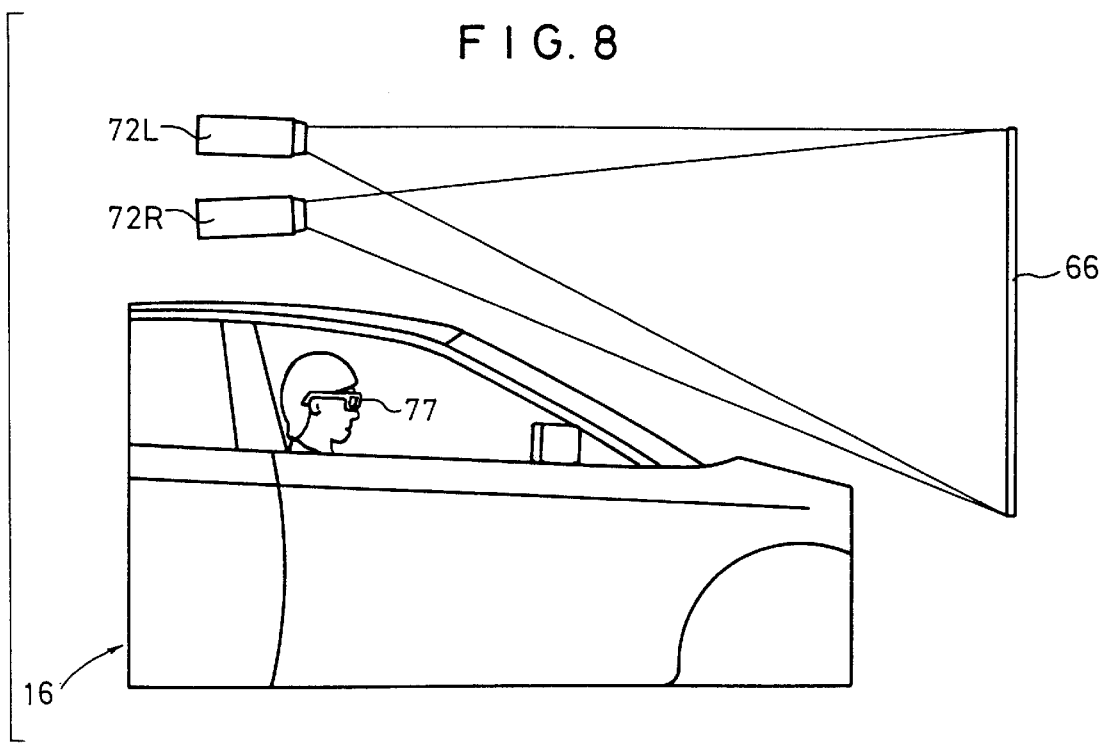
FIG. 8 shows a side view illustrating the arrangement of the projectors disposed in the cabin.

The cockpit 16, which is accommodated in the cabin 14, is surrounded by wall surfaces of the cabin 14 so that a substantially light-shielded state is given. Gateways 62, 64, which have shade curtains 58, 60 respectively, are provided in the vicinity of a door of the cockpit 16. As shown in FIG. 6, a front screen 66, a left screen 68, and a right screen 70, which are used to form a simulation image of the driving road, are arranged on the front, left, and right sides in front of the cockpit 16. As shown in FIGS. 6 to 8, two front projectors 72L, 72R opposing to the front screen 66, two left projectors 74L, 74R opposing to the left screen 68, and right projectors 76L, 76R opposing to the right screen 70 are arranged on upper surface portions of the cabin 14. The six projectors, i.e., the front projectors 72L, 72R, the left projectors 74L, 74R, and the right projectors 76L, 76R, which constitute an image display unit (front image display means), are connected to the CG generator 26. The reason why the respective two projectors, i.e., the front projectors 72L, 72R, the left projectors 74L, 74R, and the right projectors 76L, 76R are arranged corresponding to the front screen 66, the left screen 68, and the right screen 70 respectively is that it is intended to form a stereoscopic simulation image by using a polarization glass 77 to be installed by the driver as shown in FIG. 8.

Figure 9:
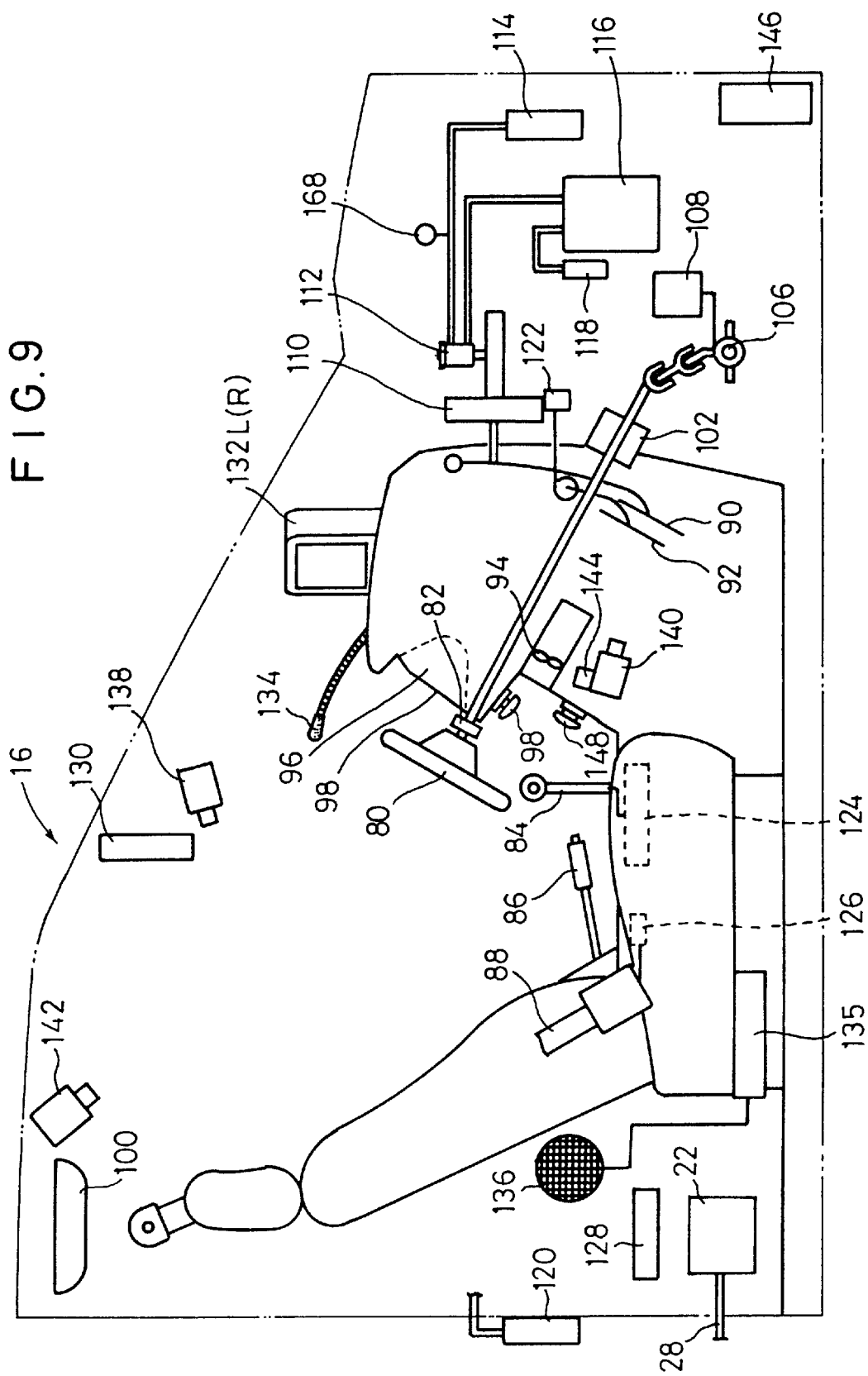
FIG. 9 illustrates various operation equipments arranged in the cockpit.

As shown in FIGS. 6 and 9, the cockpit 16 is provided with, for example, various operation equipments and various sensors to be operated by the driver. That is, those provided in the cockpit 16 include, for example, a steering wheel 80, a combination switch 82 for operating a winker or the like, a shift lever 84, a side brake 86, a seat belt 88, a brake pedal 90, an accelerator pedal 92, an air conditioning fan 94, meters 96 such as a speed meter and a tachometer, an operation switch 98 for operating a siren or the like to be used for an emergency automobile, and a courtesy light 100, in the same manner as in a real vehicle.

A braking booster 110, a master cylinder 112, a brake caliper 114, and a negative pressure pump 118 for supplying the negative pressure to the braking booster 110 via a negative pressure tank 116 and the master cylinder 112 are connected to the brake pedal 90. A rear wheel brake caliper 120 is also connected to the master cylinder 112 in the same manner as described above. An ABS (antilock braking system) control unit 128 is connected to the master cylinder 112, with which the antilock control is made for the brake. A throttle opening degree sensor 122 is connected to the accelerator pedal 92. A shift position sensor 124 is connected to the shift lever 84. A seat belt installation detection sensor 126 is connected to the site to which the seat belt 88 is installed.

Figure 10:
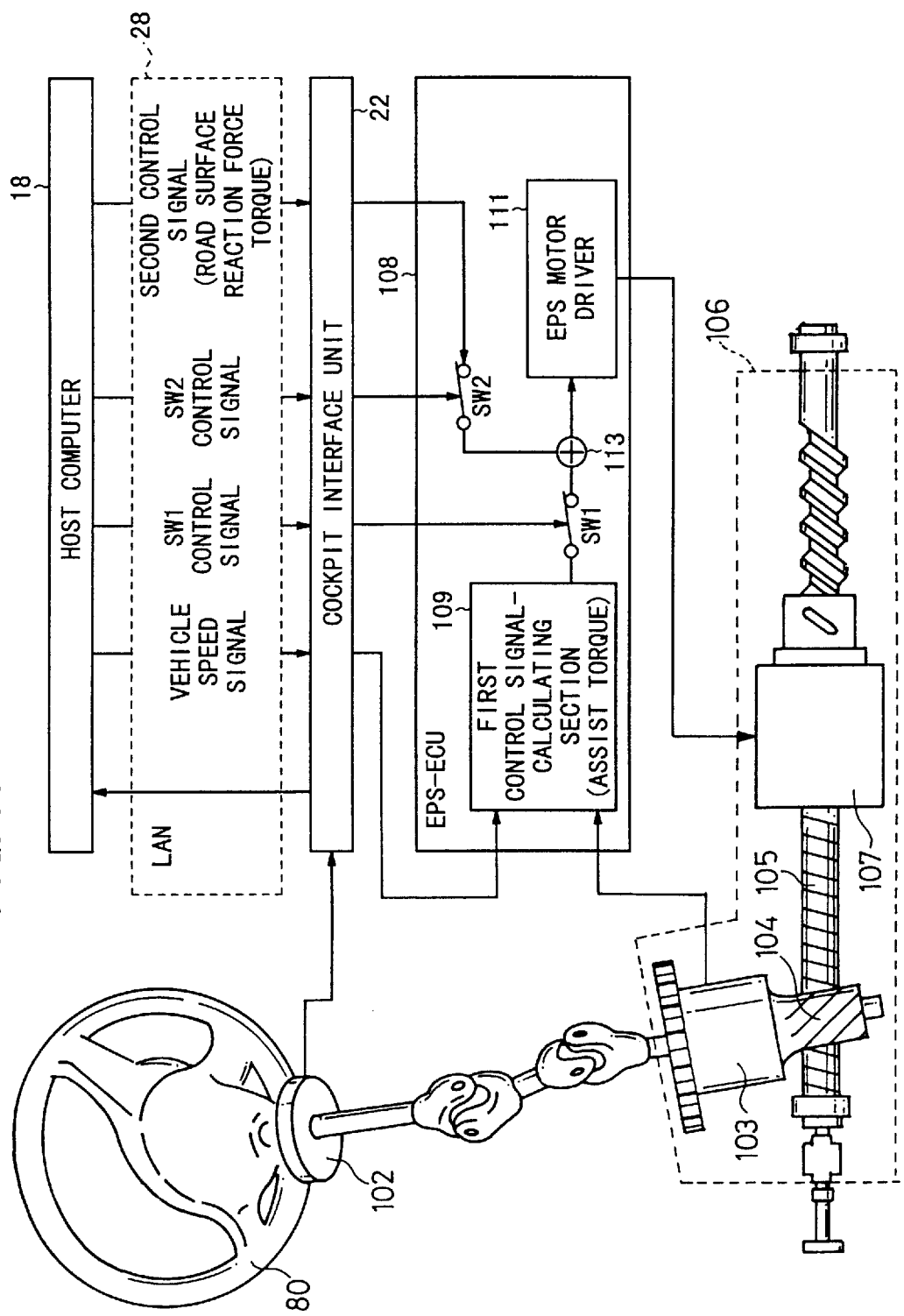
FIG. 10 shows a block diagram illustrating a control circuit for an electric power steering mechanism.

As shown in FIG. 10, a steering angle sensor 102 such as a potentiometer and a rotary encoder for detecting the steering angle of the steering wheel 80, and a steering gear box 106 for converting the rotary motion of the steering wheel 80 into the reciprocating motion are connected to the steering wheel 80. A torque sensor 103 to serve as a steering torque-detecting means for detecting the steering torque of the steering wheel 80, a pinion 104 and a rack 105 for converting the rotary motion of the steering wheel shaft into the rectilinear motion, and an electric power steering (EPS) motor 107 arranged coaxially with the rack 105 for driving a ball nut mechanism provided for the rack 105 are contained in the steering gear box 106 which is provided with an electric power steering mechanism as a steering assist means. The electric power steering (EPS) motor 107 is driven and controlled by an electric power steering control unit (EPS-ECU) 108.

The electric power steering control unit 108 includes a first control signal-calculating section 109 (first control signal-generating means) for calculating a first control signal to control the electric power steering motor 107 on the basis of a steering torque signal of the steering wheel shaft 104 detected by the torque sensor 103 and a vehicle speed signal supplied from the host computer 18 via the cockpit interface unit 22. The electric power steering control unit 108 further includes an electric power steering (EPS) motor driver 111 for driving the electric power steering motor 107 on the basis of a target current. A switch SW1 and an adder 113 (adding means) are connected in series between the first control signal-calculating section 109 and the EPS motor driver 111. The switch SW1 is subjected to ON/OFF control in accordance with an SW1 control signal supplied from the host computer 18 via the cockpit interface unit 22. A switch SW2 (selector switch) is connected between the cockpit interface unit 22 and the adder 113. A second control signal for controlling the electric power steering motor 107 is supplied to the adder 113 via the switch SW2. The switch SW2 is subjected to ON/OFF control in accordance with an SW2 control signal supplied from the host computer 18.

In this embodiment, the arrangement concerning the steering wheel 80 and the electric power steering control unit 108 is different from that of the real vehicle as follows. That is, neither tie rod nor wheel is installed to both ends of the rack 105. and the switches SW1, SW2 and the adder 113 are added to the circuit of the electric power steering control unit 108. The other components are the same as those of the real vehicle.

Constitutive components inherent to the drive simulation apparatus 10 of this embodiment are further arranged in the cockpit 16. That is, those provided near a driver's seat are a room mirror LCD display 130 which constitutes a rear image display means (back mirror display) for displaying a simulation image of the rear scene of the vehicle, left and right door mirror LCD displays 132L, 132R, a microphone 134 for transmitting the voice of the driver to the external operator, a speaker 136 (acoustic equipment) for transmitting the sound effect such as the driving sound and the voice of the operator to the driver during the simulation operation, and a driver image CCD camera 138 to serve as an image pickup means which is arranged in the vicinity of the room mirror LCD display 130 for photographing the state of the driver. The drive simulation apparatus 10 further includes a foot image CCD camera 140 for photographing the brake pedal 90 and the accelerator pedal 92, and a steering image CCD camera 142 for photographing the surroundings of the steering wheel 80. An illuminating lamp 144 is arranged in the vicinity of the foot image CCD camera 140. Those further arranged in the cockpit 16 are a battery 146 for supplying auxiliary electric power to the drive simulation apparatus 10, a simulation stop switch 148 for stopping the simulation action by the driver himself, and the cockpit interface unit 22 for sending and receiving signals via LAN 28 between the cockpit 16 and the host computer 18.

Figure 11:
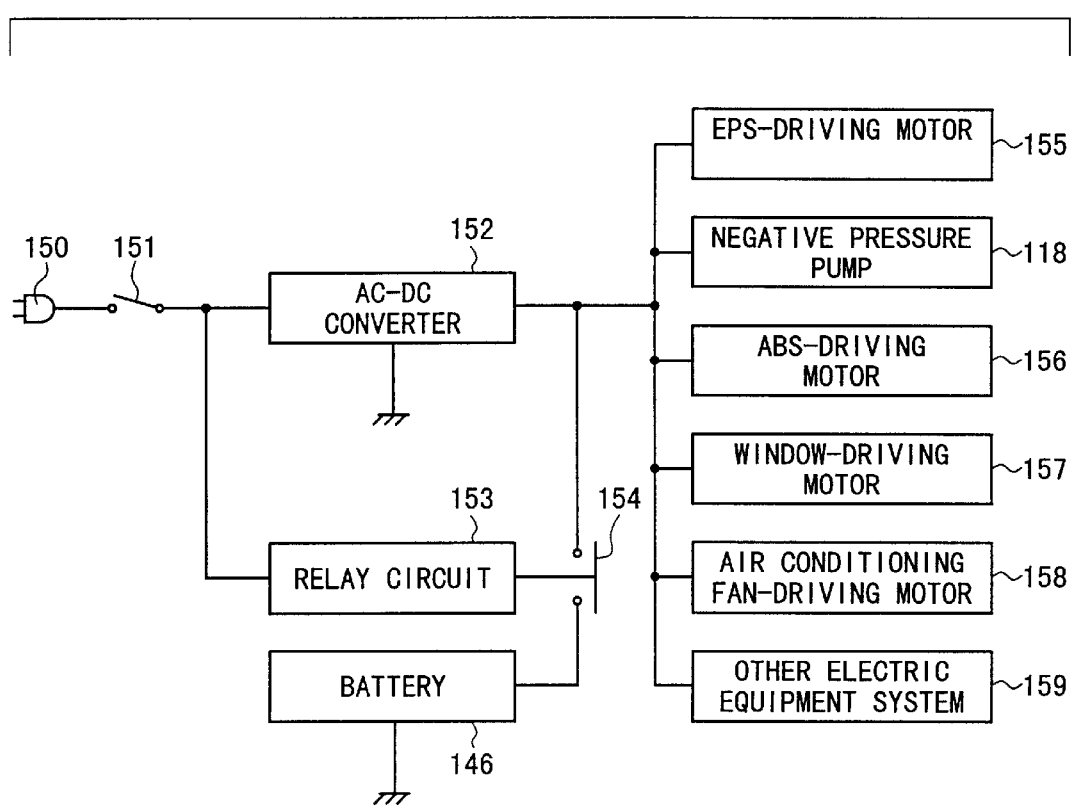
FIG. 11 shows a block diagram illustrating a circuit for supplying electric power, for example, to various operation equipments provided in the cockpit.

FIG. 11 shows a circuit block diagram for supplying the electric power to the various operation equipments provided in the cockpit 16 constructed as described above. In this embodiment, the electric power (for example, AC 100 V or AC 200 V) is supplied via a plug 150 from the external power source to the cockpit 16. An AC-DC converter 152 is connected to the plug 150 via a start switch 151 of the drive simulation apparatus 10. A battery 146 is connected in parallel to the AC-DC converter 152 via a contact 154 of a relay circuit 153. The relay circuit 153 is operated such that when the start switch 151 is turned ON, then the contact 154 is closed, and the battery 146 is connected to the AC-DC converter 152.

An electric power steering (EPS)-driving motor 155 connected to the electric power steering gear box 106 provided in the cockpit 16, the negative pressure pump 118 for operating the braking booster 110, an ABS-driving motor 156 for operating the master cylinder 112 during the operation of ABS, a window-driving motor 157 for operating the power window, an air conditioning fan-driving motor 158 for operating the air conditioning fan 94, and other electric equipment systems 159 are connected to the AC-DC converter 152 and the battery 146.

Figure 12:
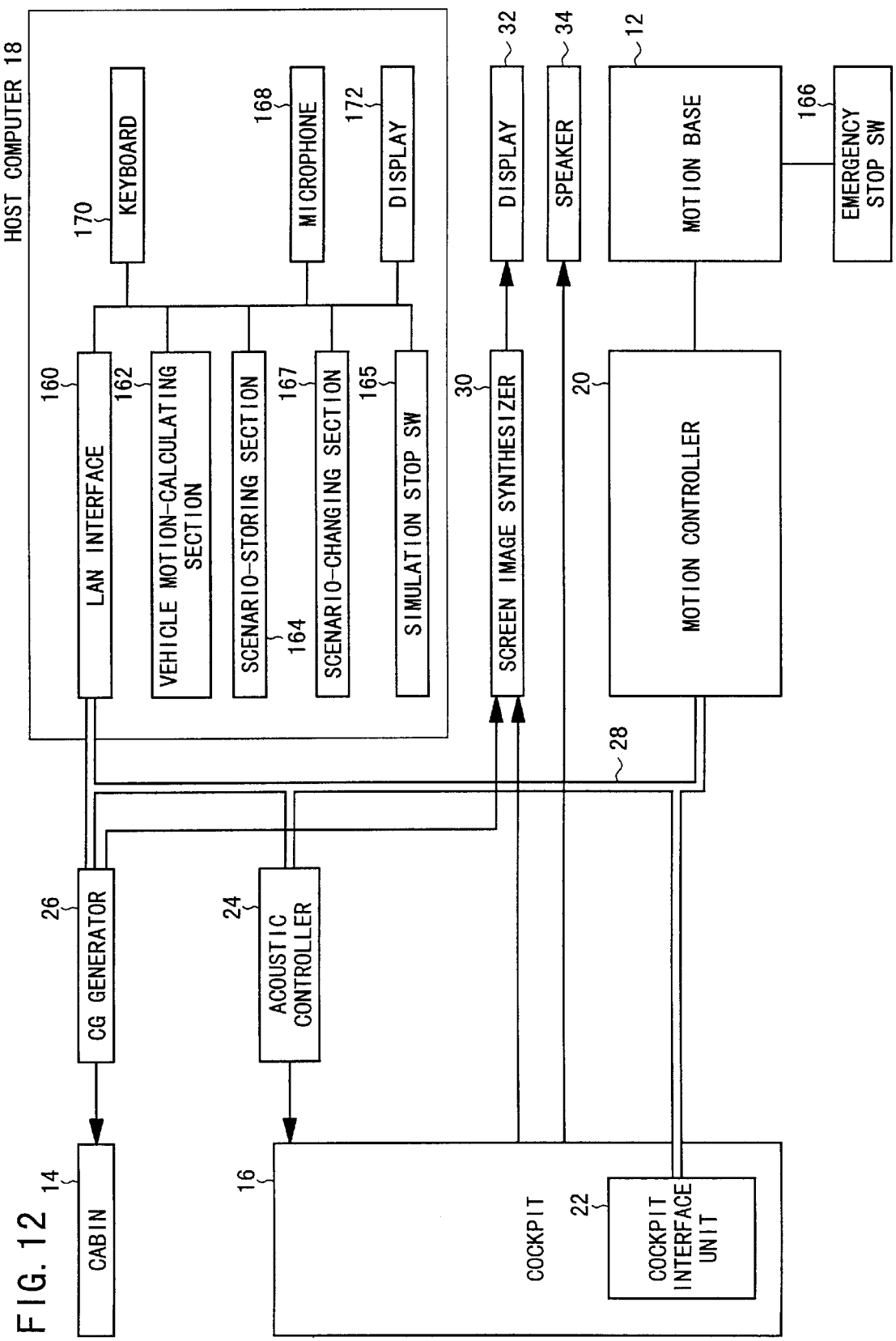
FIG. 12 shows a block diagram illustrating an arrangement of a control system for the entire drive simulation apparatus.

Next, explanation will be made for the arrangement of the control system of the drive simulation apparatus 10 on the basis of FIGS. 12 to 15. With reference to FIG. 12, the host computer 18 comprises a LAN interface 160 for sending and receiving signals via LAN 28 among the motion controller 20, the cockpit interface unit 22, the acoustic controller 24, and the CG generator 26, a vehicle motion-calculating section 162 for calculating motion information on the vehicle on the basis of the operation of the driver, a scenario-storing section 164 (scenario-holding means) for storing various scenarios for the simulation, a scenario-changing section 167 (scenario-changing means) for selecting a corresponding scenario from the scenario-storing section 164 on the basis of the operation of the driver to change the scenario to be displayed, a simulation stop switch 165 for stopping the simulation operation in accordance with the operation of the operator, a microphone 168 for making conversation with the driver, and a keyboard 170 and a display 172 for performing, for example, various setting processes and monitoring by the operator.

Figure 13:
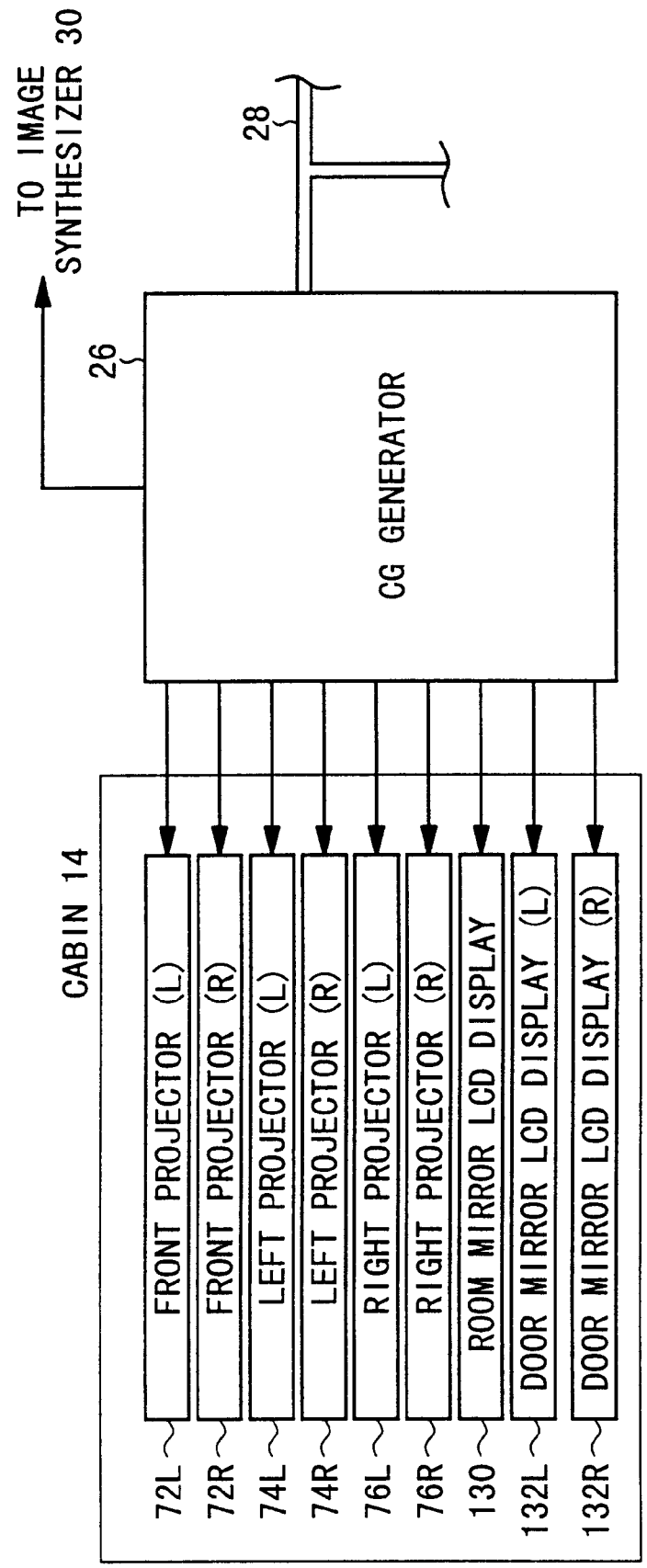
FIG. 13 shows a block diagram illustrating an arrangement of a control system including the projectors in the cabin.

With reference to FIG. 13, the front projectors 72L, 72R, the left projectors 74L, 74R, the right projectors 76L, 76R, the room mirror LCD display 130, and the door mirror LCD displays 132L, 132R, which are arranged in the cabin 14, are connected to the CG generator 26 respectively as described above.

Figure 14:
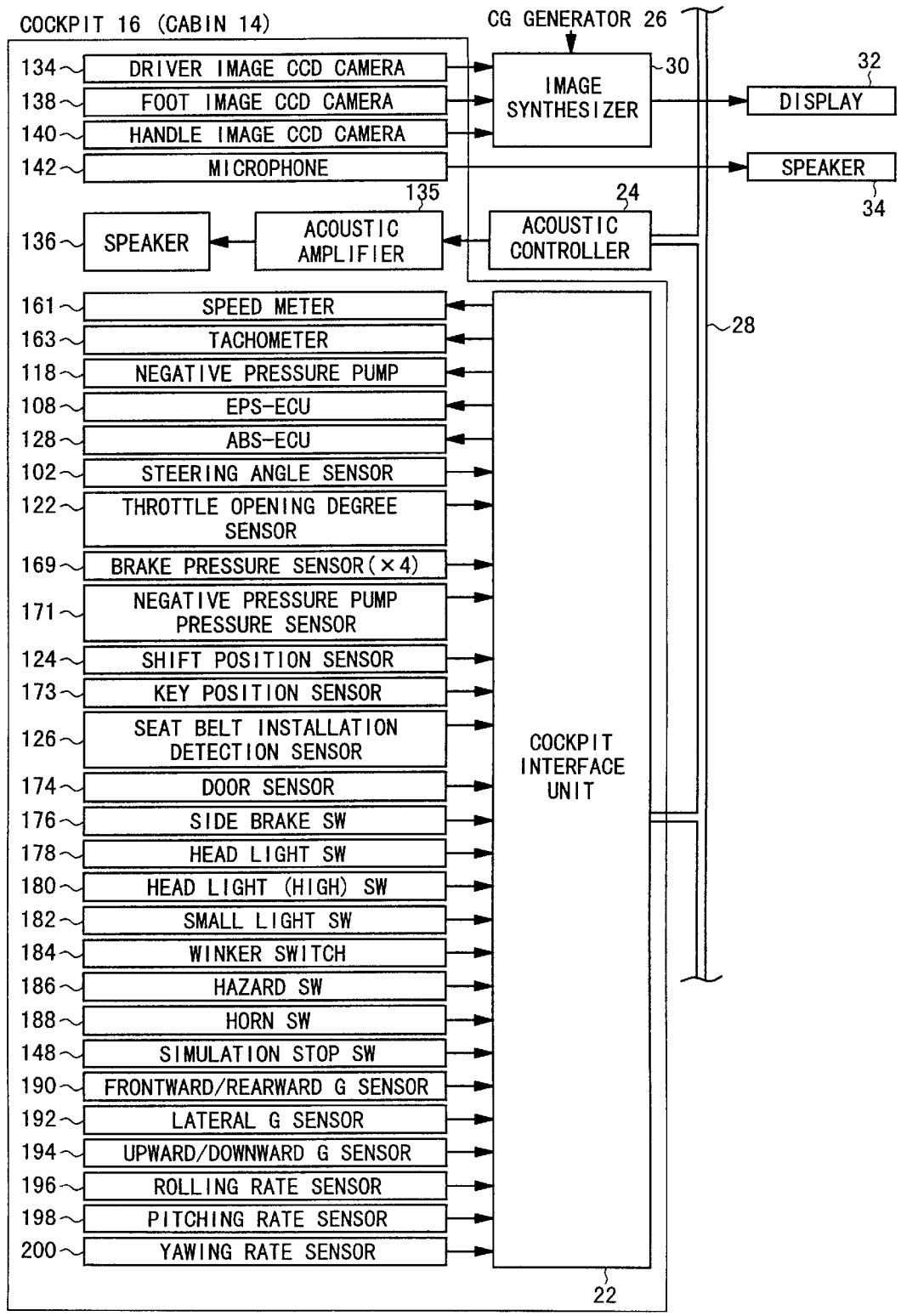
FIG. 14 shows a block diagram illustrating an arrangement of a control system including the various operation equipments and sensors in the cockpit.

With reference to FIG. 14, the speaker 136 is connected to the acoustic controller 24 via an acoustic amplifier 135 disposed in the cockpit 16. The driver image CCD camera 138, the foot image CCD camera 140, and the steering image CCD camera 142, which are arranged in the cockpit 16, are connected to the image synthesizer 30. The CG generator 26 is also connected to the image synthesizer 30. The speed meter 161, the tachometer 163, the negative pressure pump 118, the electric power steering control unit (EPS-ECU) 108, the ABS control unit (ABS-ECU) 128, the steering angle sensor 102, the throttle opening degree sensor 122, the brake pressure sensor 169, the negative pressure pump pressure sensor 171, the shift position sensor 124, the key position sensor 173, the seat belt installation detection sensor 126, the door sensor 174, the side brake switch 176, the head light switches 178, 180, the small light switch 182, the winker switch 184, the hazard switch 186, the horn switch 188, the simulation stop switch 148, the frontward/rearward G sensor 190, the lateral G sensor 192, the upward/downward G sensor 194, the rolling rate sensor 196, the pitching rate sensor 198, and the yawing rate sensor 200 are connected to the cockpit interface unit 22 respectively.

Figure 15:
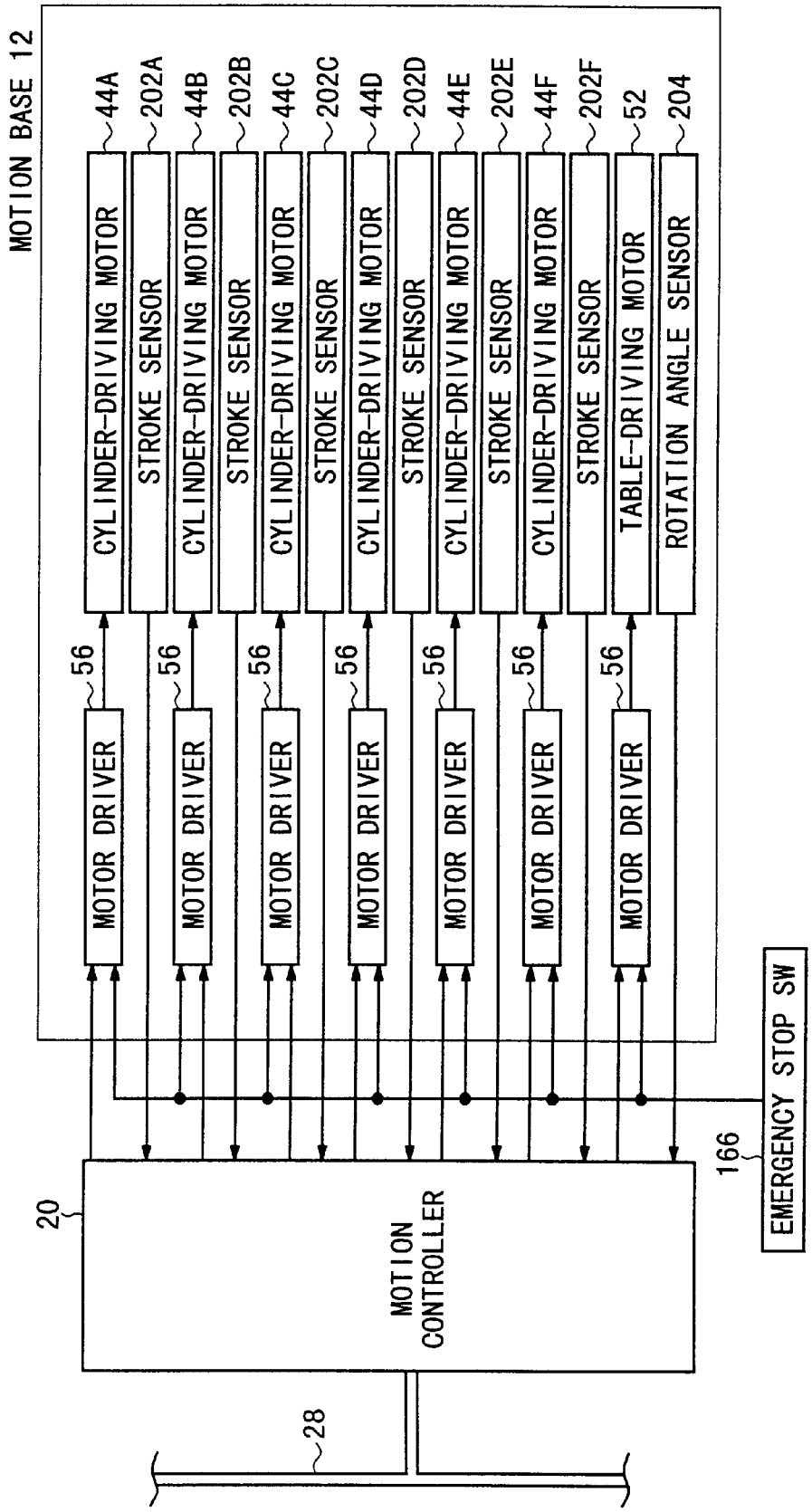
FIG. 15 shows a block diagram illustrating an arrangement of a control system for the motion base.

With reference to FIG. 15, the respective cylinder-driving motors 44A to 44F and the table-driving motor 52 are connected to the motion controller 20 via the respective motor drivers 56. The stroke sensors 202A to 202F are connected to the respective cylinder-driving motors 44A to 44F. The signals therefrom are supplied to the motion controller 20. The rotation angle sensor 204 is connected to the table-driving motor 52. The angle of rotation, which is detected by the rotation angle sensor 204, is supplied to the motion controller 20.

Figure 16:
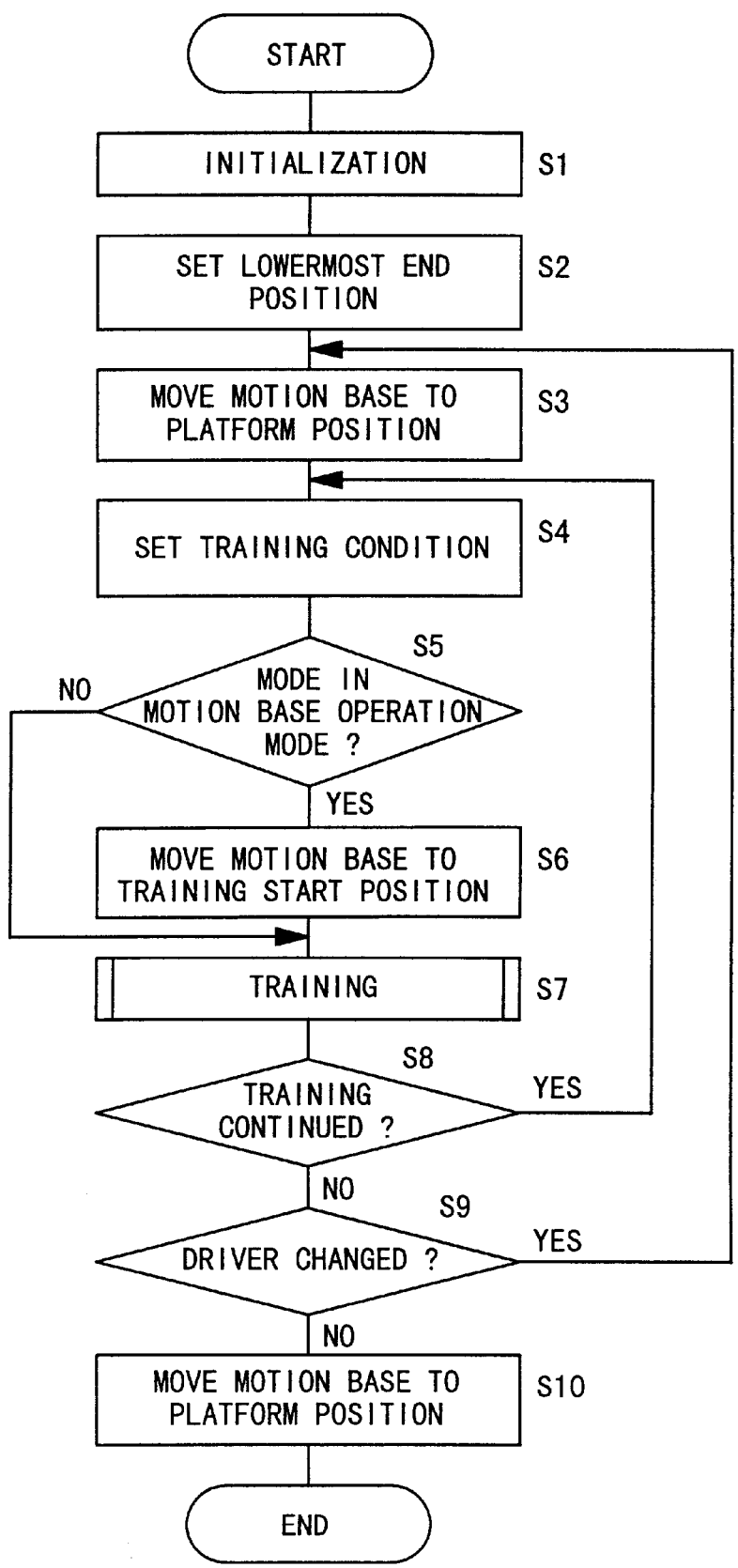
FIG. 16 shows a processing flow chart for the drive simulation apparatus.

The drive simulation apparatus 10 according to the embodiment of the present invention is basically constructed as described above. Next, its operation will be explained with reference to flow charts shown in FIGS. 16 and 17.

At first, the operator starts the drive simulation apparatus 10 by operating, for example, the keyboard 170 of the host computer 18. When the drive simulation apparatus 10 is started, the host computer 18 initializes the respective states of the drive simulation apparatus 10 (step Si).

When the drive simulation apparatus 10 is started, the start switch 151 shown in FIG. 11 is turned ON. Accordingly, the alternating current, which is supplied from the external power source via the plug 150, is converted by the AC-DC converter 152 into the direct current which is supplied to the electric equipment system including, for example, the sensors and the respective operation equipments in the cockpit 16. When the start switch 151 is turned ON, the relay circuit 153 turns ON the contact 154. Accordingly, the direct current from the battery 146 is also supplied to the electric equipment system including, for example, the sensors and the respective operation equipments in the cockpit 16. Therefore, even when the AC-DC converter 152 having not so large capacity is used, the sufficient current can be supplied to the electric equipment system of the cockpit 16. As a result, the sufficient current can be supplied to the respective electric equipment systems to perform the processing during the operation of the drive simulation apparatus 10, for example, even when an excessive current is required by driving the EPS-driving motor 155, or when a plurality of electric equipment systems including, for example, the negative pressure pump 118, the ABS-driving motor 156, and the air conditioning fan-driving motor 158 are simultaneously driven in accordance with the operation of the driver.

Subsequently, the host computer 18 sends the driving command signal for the cylinder-driving motors 44A to 44F to the motion controller 20 from the LAN interface 160 via LAN 28. The motion controller 20 controls the motor drivers 56 on the basis of the driving command signal. The motor drivers 56 supply the electric power based on the driving command signal to the cylinder-driving motors 44A to 44F.

In this process, the unillustrated brake mechanisms, which are provided for the cylinders A to F. are turned OFF to enable the operation of the rod sections 42.

The cylinder-driving motors 44A to 44F are operated on the basis of the driving command signal to move the rod sections 42 of the cylinders A to F toward the lower support bars 36a to 36c in order to initialize the unillustrated stroke sensors having no absolute positions, such as rotary encoders provided for the cylinders A to F. That is, the rod sections 42 are moved downwardly. The position of the rod section 42, at which the unillustrated limit switch provided for the cylinder A to F is turned ON, is designated as the initial position (lowermost end position). The output of the stroke sensor at this position is set to be the initial value (step S2).

Subsequently, the cylinder-driving motors 44A to 44F are driven again on the basis of the driving command signal from the host computer 18. Accordingly, the rod sections 42 of the cylinders A to F are moved upwardly by the predetermined amount, and the cabin 14 is moved to the platform position (step S3). The driver gets on or off the apparatus, or the driver is changed at this position.

After the cabin 14 is installed at the predetermined platform position, the operator sets the training condition (step S4). In this process, the training condition includes, for example, selection conditions for the urban area driving training, the highway driving training, the circuit driving training or the like, and selection conditions for the daytime driving, the nighttime driving, the driving in fog or the like. Either the mode in which the motion base 12 is operated ("motion base operation mode"), or the mode in which the motion base 12 is not operated ("motion base fixed mode") is selected as the training condition by using the mode-selecting means such as the keyboard 170 depending on the contents of training for the driver.

After the setting of the training condition is completed, if the "motion base operation mode" is selected by the operator (step S5), the host computer drives the cylinders A to F to move the cabin 14 from the platform position set in the step S3 to the predetermined training start position (step S6). Specifically, the cylinders C to F, which are arranged under the front portion of the cabin 14, are dominantly driven to set the cabin 14 to be in an up-in-front state.

Figure 18:
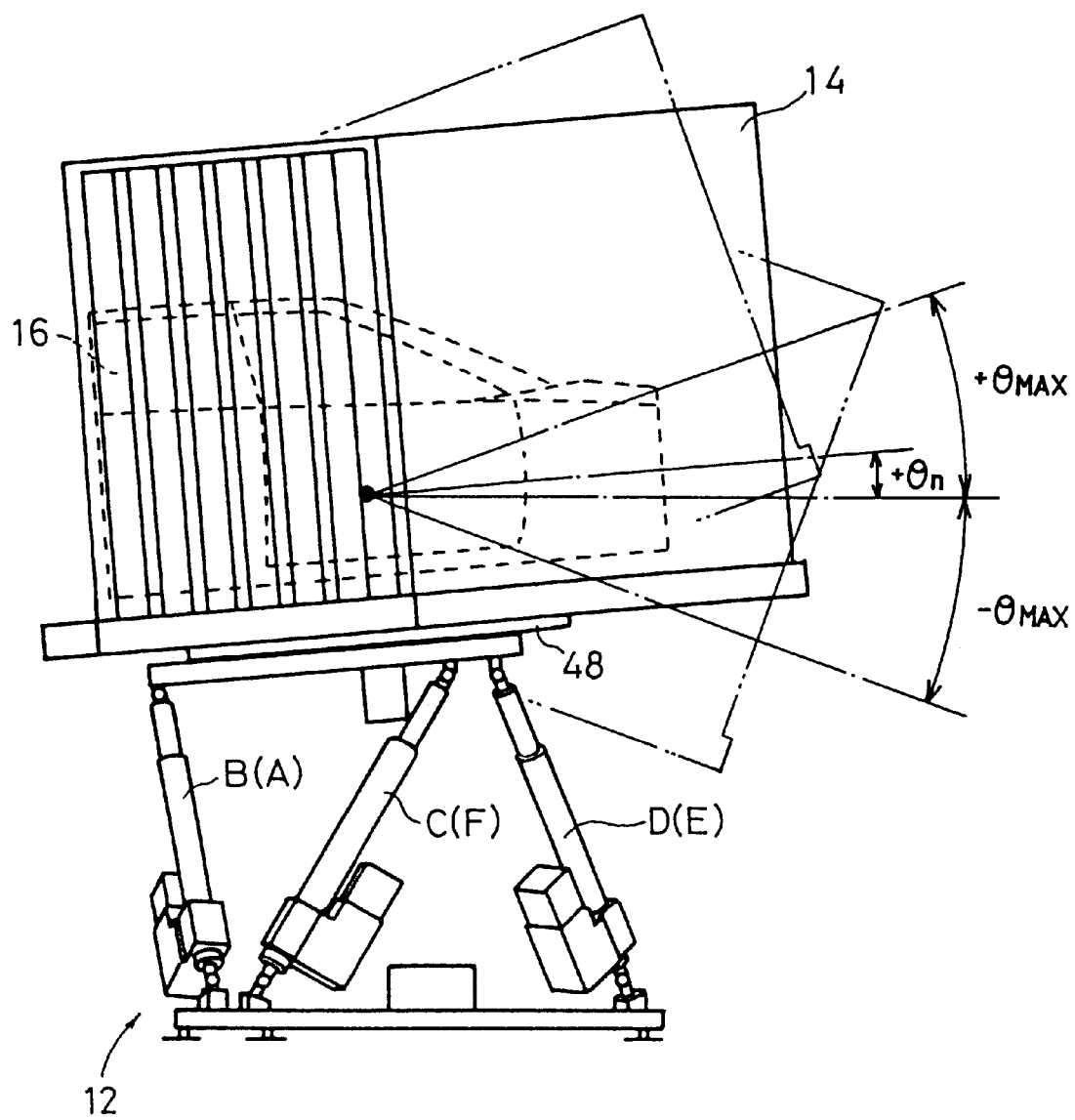
FIG. 18 illustrates a state in which the motion base is offset to lift-up the front portion of the cockpit.

That is, in the case of the vehicle to be simulated by the drive simulation apparatus 10, if the amount of upward movement of the front portion upon rapid start is compared with the amount of downward movement of the front portion upon rapid stop, the amount of downward movement of the front portion upon rapid stop is larger. Accordingly, as shown in FIG. 18, it is assumed that the maximum angle is $\theta_{MAX}$ and the minimum angle is $\theta_{MIN}$ for the pitch angle of the motion base 12 with respect to the horizontal surface. The apparatus is set so that the front portion of the cockpit 16 is directed upwardly by the offset angle $\theta_n$ in the upward direction with respect to the horizontal surface. When the setting is made as described above, the cockpit 16 has a movable range of an angle of $(\theta_{MAX}-\theta_n)$ in the upward direction, and it has a movable range of an angle of $(\theta_{MIN}+\theta_n)$ in the downward direction. As a result, the simulation can be performed by effectively utilizing the movable range of the cylinders A to F which constitute the motion base 12.

Figure 19:
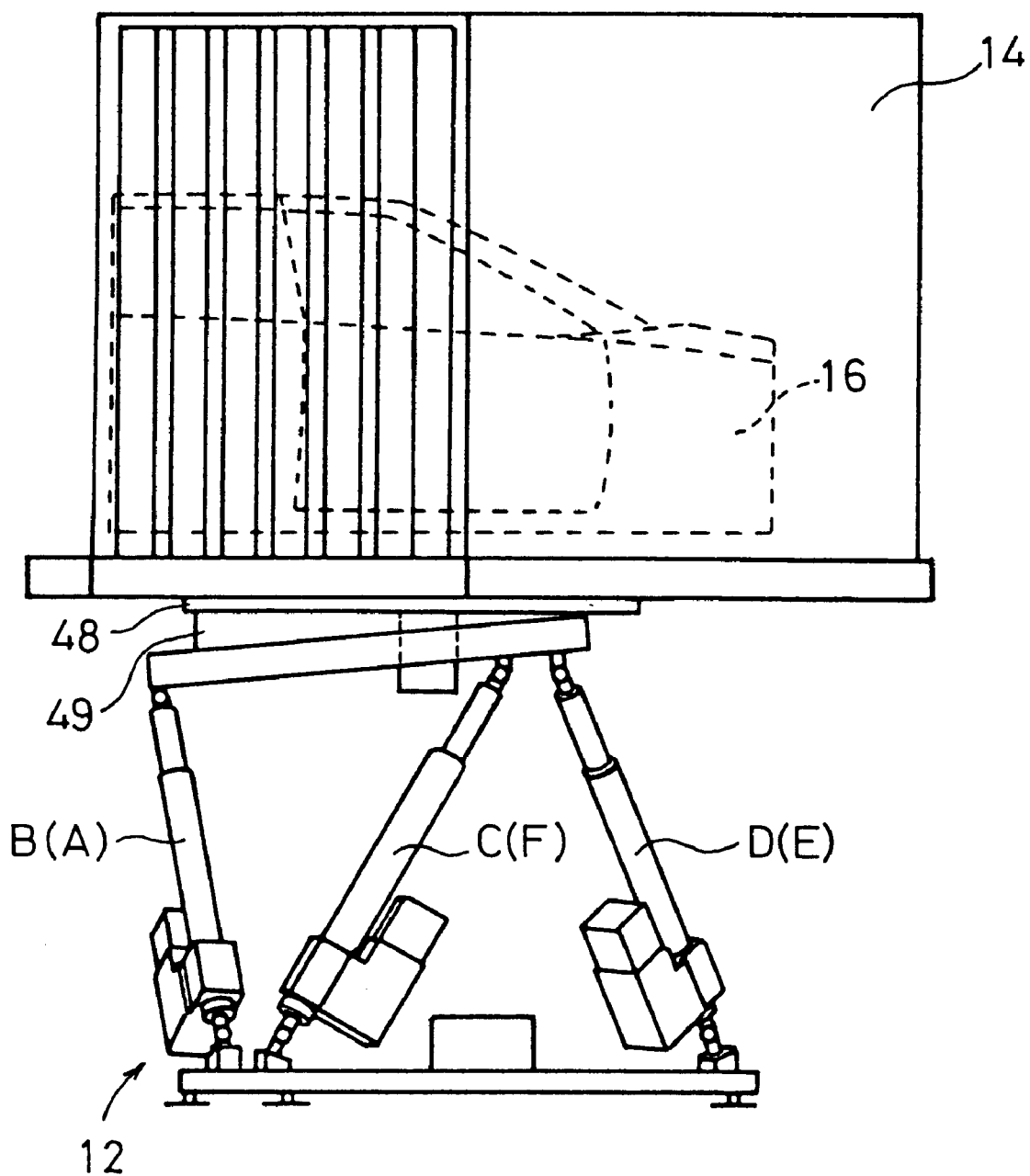
FIG. 19 illustrates a state in which the motion base is offset to maintain the cockpit horizontally by the aid of an inclination table.

When the setting is made by upwardly moving the front portion of the cockpit 16 in the state before the start of the simulation as described above, it is feared that the driver feels a sense of incongruity. Accordingly, the apparatus may be arranged as shown in FIG. 19. That is, the inclination table 49, which serves to incline the cockpit 16 frontwardly with respect to the motion base 12, is allowed to intervene between the cabin 14 and the rotary table 48 arranged on the motion base 12. The cockpit 16 is inclined in an amount corresponding to the offset angle $\theta_n$ to be brought about by the motion base 12 so that the cockpit 16 is substantially maintained in a horizontal state. Thus, the simulation can be performed without causing any sense of incongruity of the driver, by effectively utilizing the movable range of the cylinders A to F.

On the other hand, if the "motion base fixed mode" is selected in the step S4, the operation of the motion base 12 is fixed at the platform position set in the step S3. In this case, the cabin 14 is fixed in the "motion base fixed mode". Therefore, it is less necessary that the operator monitors the operation state of the drive simulation apparatus 10 from the outside. Therefore, it is possible to reduce the number of workers. Further, the operator himself can get on the cockpit 16 to assist the training.

After the cabin 14 is set to be in the training start state as described above, the driver operates the various operation equipments in the cockpit 16 to start the training (step S7).

Figure 17:
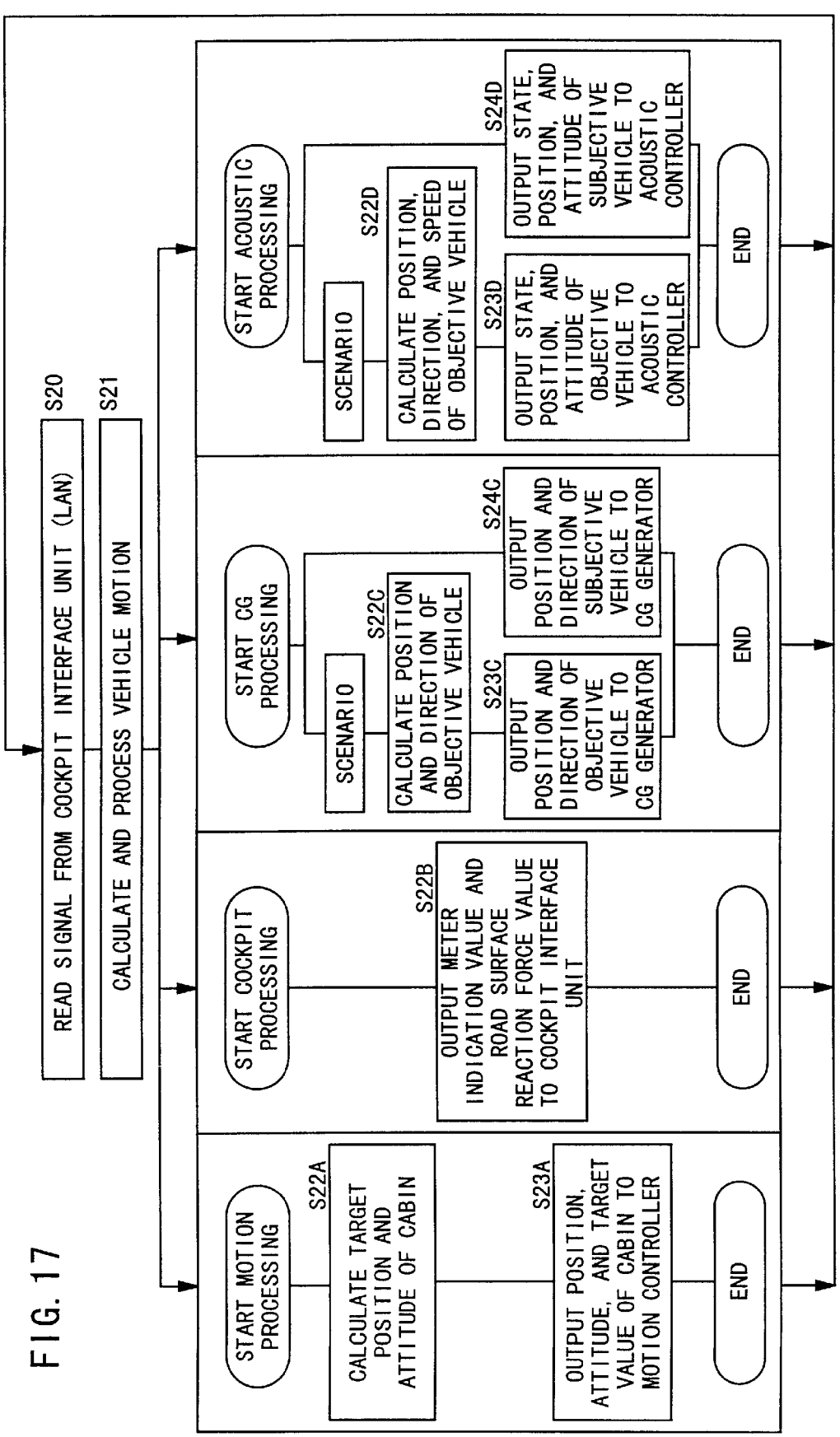
FIG. 17 shows a processing flow chart concerning a subroutine shown in FIG. 16.

The control operation effected by the host computer 18 will now be explained on the basis of the flow chart shown in FIG. 17.

In this state, a simulation image at the start position of the scenario, which is selected from the scenario-storing section 164 on the basis of the training condition set by the operator and which is prepared by the CG generator 26, is projected onto the front screen 66, the left screen 68, and the right screen 70 in the cabin 14 by the front projectors 72L, 72R, the left projectors 74L, 74R, and the right projectors 76L. 76R. A simulation image at the back of the vehicle is also formed on the room mirror LCD display 130 in the cockpit 16 and on the door mirror LCD displays 132L, 132R in the same manner as described above.

When the driver turns ON the ignition, the signal from the key position sensor 173 is supplied via the cockpit interface unit 22 to the host computer 18. Subsequently, the training is started by the driver by operating the shift lever 84, the accelerator pedal 92, the brake pedal 90, the steering wheel 80, and other equipments. The respective operation signals generated thereby are supplied via the cockpit interface unit 22 to the host computer 18 (step S20). The host computer 18, which receives the operation signals generated by the operation by the driver and supplied from the cockpit 16, starts the calculation processing for the vehicle motion by using the vehicle motion-calculating section (step S21).

Figure 20:
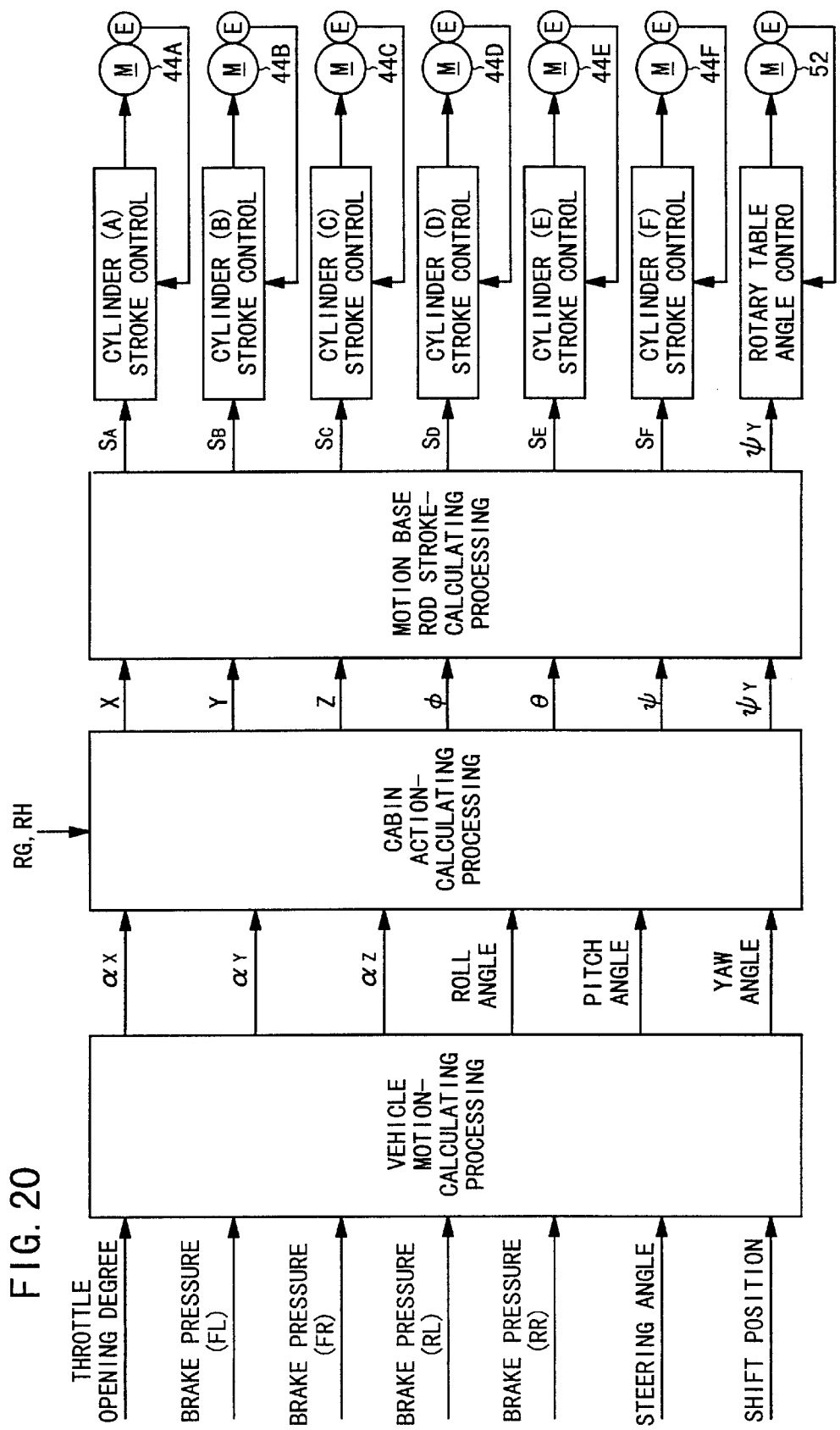
FIG. 20 illustrates the flow of processing ranging from the vehicle motion-calculating processing performed by a host computer to the control of the motion base performed by a motion controller.

That is, as shown in FIG. 20, the vehicle motion-calculating section 162 of the host computer 18 determines the motion information of the real vehicle, i.e., the frontward/rearward displacement amount $\alpha_X$, the lateral displacement amount $\alpha_Y$, and the vertical displacement amount $\alpha_Z$, the roll angle, the pitch angle, and the yaw angle on the basis of, for example, the signal from the throttle opening degree sensor 122, the signal from the brake pressure sensor 169, the signal from the steering angle sensor 102, and the signal from the shift position sensor 124 supplied from the cockpit interface unit 22 via LAN 28.

Subsequently, the host computer 18 performs In parallel the four processings, i.e., the motion processing, the cockpit processing, the CG processing, and the acoustic processing on the basis of the result of calculation of the motion information of the real vehicle obtained in the step S21.

If the "motion base operation mode" is selected in the step S4 (see FIG. 16), the target position X, Y, Z and the target attitude (roll angle φ, pitch angle θ, yaw angles ψ, ψ$_Y$) are determined in the motion processing by calculation from the motion information of the real vehicle determined in the step S21 (step S22A).

In this arrangement, the yaw angle ψ is a high frequency component of the yaw angle controlled by the cylinders A to F, and the yaw angle ψ$_Y$ is a low frequency component of the yaw angle controlled by the rotary table 48. The cylinders A to F are composed of the ball screw mechanisms, and they are driven by the cylinder-driving motors 44A to 44F. Therefore, the yaw angle ψ as the high frequency component can be realized with high response performance. The rotary table 48 can realize the low frequency component, i.e., the yaw angle having a sufficiently wide range of rotation. As a result, for example, even when the driver greatly turns the steering wheel 80, then the cabin 14 can be rotated following thereto, and it is possible to perform the yawing action approximate to that of the real vehicle.

The allotment of the high frequency component and the low frequency component to the cylinders A to F and the rotary table 48 can be set in an arbitrary manner. The yawing action of the cabin 14 can be performed by selectively operating the cylinders A to F and the rotary table 48.

Two points are previously set as swinging centers of the cockpit 16 in the vehicle motion-calculating section 162 of the host computer 18, i.e., the point RG which corresponds to the position of the center of gravity of the real vehicle, and the point RH which corresponds to the head position of the driver in the drive simulation apparatus 10.

Accordingly, in the vehicle motion-calculating section 162, the target position X, Y, Z and the attitude (roll angle φ, pitch angle θ, yaw angles ψ, ψ$_Y$) are calculated as follows by using the information on the two swinging centers on the basis of the signals obtained from the cockpit interface. That is, it is assumed that the target position X=0, Y=0, Z=0 and the attitude (roll angle φ, pitch angle θ, yaw angles ψ, ψ$_Y$) are determined when the reference point of the motion base 12 is used as the swinging center. If the rotation is made by a roll angle φ=φ1 and a pitch angle θ=θ1 by using the swinging center of the point RG corresponding to the position of the center of gravity, the target position is represented by X=ΔX1, Y=ΔY1, Z=ΔZ1 provided that the positional deviation of the reference point caused by the rotation is represented by ΔX1, ΔY1, ΔZ1. Similarly, if the rotation is made by a roll angle φ=φ2 and a pitch angle θ=θ2 by using the swinging center of the point RH corresponding to the head position of the driver, the target position is represented by X=ΔX2, Y=ΔY2, Z=ΔZ2 provided that the positional deviation of the reference point caused by the rotation is represented by ΔX2, ΔY2, ΔZ2. Therefore, if the both of the point RG corresponding to the position of the center of gravity and the point RH corresponding to the head position are set as the swinging centers, the vehicle motion-calculating section 162 determines the target position X, Y, Z, and the attitude φ, θ for the respective swinging centers to add obtained results. By doing so, the vehicle motion-calculating section 162 determines the target position X=ΔX1+ΔX2, Y=ΔY1+ΔY2, Z=ΔZ1+ΔZ2, the roll angle φ=φ1+φ2, and the pitch angle θ=θ1+θ2.

Subsequently, the host computer 18 outputs the calculation results of the target values of the position and the attitude via LAN 28 to the motion controller 20 (step S23A). The target values, which are received by the motion controller 20, are converted thereby into the strokes S$_A$ to S$_F$ of the cylinders A to F and the yaw angle ψ$_Y$ as the rotation angle signal for the rotary table 48. The motion controller 20 controls the respective motor drivers 56 to drive the respective cylinder-driving motors 44A to 44F and the table-driving motor 52. As a result, the cockpit 16 in the cabin 14, which is supported on the motion base 12, makes swinging movement in accordance with the operation of the driver.

In this embodiment, the swinging center of the cockpit 16 is set considering both of the position of the center of gravity of the vehicle and the head position of the driver. Therefore, the driver can physically feel both of the swinging state approximate to the pitching action and the rolling action of the real vehicle and the acceleration approximate to that of the real vehicle. Further, there is no excessive swinging movement of the head, and hence it is possible to prevent the simulator motion sickness.

If the "motion base fixed mode" is selected in the step S4 (see FIG. 16), the motion processing is not executed at all. The motion base 12 remains fixed at the platform position. In this case, for example, if the driver is a beginner, the driver can concentrate on the simulation performed in accordance with the image displayed on the front screen and the meters in the cockpit 16.

On the other hand, in the cockpit processing, the signals are outputted to perform the control of the various operation equipments in the cockpit 16 on the basis of the result of calculation of the motion information of the real vehicle determined in the step S21 (step S22B). For example, the host computer 18 calculates the indication values of the speed meter 161, the tachometer 163 and the like on the basis of the pedaling amount of the accelerator pedal 92 detected by the throttle opening degree sensor 122, and obtained results are sent to the cockpit interface unit 22. The cockpit interface unit 22 reads the indication values to send them to the meters 96 in the cockpit 16. The meters 96 in the cockpit 16 make desired indication on the basis of the transmitted signals.

In the cockpit processing, the host computer 18 controls the electric power steering control unit 108 via the cockpit interface unit 22 to generate an appropriate torque equivalent to that of the real vehicle for the steering wheel 80 so that the same steering feeling as that of the real vehicle is given to the driver. The processing will be explained with reference to FIG. 10.

At first, the host computer 18 supplies the SW1 control signal and the SW2 control signal to the electric power steering control unit 108 via the cockpit interface unit 22 to set the switches SW1, SW2 to be in the ON state.

In this state, the vehicle motion-calculating section 162 of the host computer 18 inputs the signals from the steering angle sensor 102, the throttle opening degree sensor 122, the brake pressure sensor 168, and the shift position sensor 124, through the cockpit interface unit 22 via LAN 28. The vehicle motion-calculating section 162 calculates the motion of the vehicle on the basis of the signals concerning the operation of the driver. A resultant vehicle speed signal is outputted via LAN 28 to the cockpit interface unit 22 to supply it to the first control signal-calculating section 109 of the electric power steering control unit 108. The steering torque, which is generated by the operation of the steering wheel 80 by the driver, is detected by the torque sensor 103, and it is inputted into the first control signal-calculating section 109. The first control signal-calculating section 109 generates the first control signal (assist torque signal) on the basis of the inputted vehicle speed and the steering torque.

As described above, it is possible to perform the operation of the ordinary electric power steering, i.e., the assist in conformity with the vehicle speed.

In this embodiment, the first control signal and the second control signal corresponding to the road surface reaction force (road surface reaction force torque signal) are added to supply the obtained result to the electric power steering control unit 108 so that the steering feeling equivalent to that obtained by the real vehicle is obtained. That is, the road surface reaction torque, which would be generated on the pinion 104, is calculated from the result of the motion of the vehicle calculated by the vehicle motion-calculating section 162 of the host computer 18, which is outputted as the second control signal (road surface reaction force torque signal) to the cockpit interface 22 via LAN 28. The second control signal (road surface reaction force torque), which is Inputted into the cockpit interface 22, is outputted to the adder 113 via the switch SW2 of the electric power steering unit 108. In the electric power steering control unit 108, the first control signal (assist control signal) and the second control signal (road surface reaction force torque signal) are inputted into the adder 113 via the switches SW1, SW2 respectively, and they are added, followed by being outputted to the electric power steering (EPS) motor driver 111. Accordingly, the driver can obtain the same steering feeling as that of the real vehicle in which both of the road surface reaction force torque and the assist torque are taken into account. In this embodiment, the same steering gear box 106 as that of the real vehicle is also used. Therefore, the steering feeling, which depends on, for example, the mechanical friction of the steering gear box 106, can be made equal to that of the real vehicle.

In the method described above, the first control signal is generated by the first control signal-calculating section 109 to operate the electric power steering mechanism. Alternatively, the steering control signal, which includes the assist amount provided by the first control signal-calculating section 109, may be determined by the vehicle motion-calculating section 162 of the host computer 18. In this case, in the electric power steering control unit 108, the switch SW1 is turned OFF, and the switch SW2 is turned ON. The control signal, in which both of the assist torque and the road surface reaction force torque are taken into account, is outputted to the EPS motor driver 111 to drive and control the electric power steering motor 107. Accordingly, the same steering feeling as that of the real vehicle can be obtained in the same manner as described above.

If any abnormal situation occurs during the simulation, both of the switches SW1, SW2 are turned OFF. Thus, the electric power steering mechanism is allowed to be in the state of out of operation, and the steering torque can be made to be zero.

In the CG processing, the host computer 18 determines the information concerning the position and the direction of the objective vehicle (step S22C) on the basis of the scenario and the calculation result of the motion information of the real vehicle determined in the step S21. The information is outputted to the CG generator 26 via LAN 28 together with the information concerning the subjective vehicle (steps S23C, S24C). Based on the information, the CG generator 26 forms the simulation image including, for example, the driving road and the objective vehicle. The image signals are transmitted to the front projectors 72L, 72R, the left projectors 74L, 74R, the right projectors 76L, 76R, the room mirror LCD display 130, and the door mirror LCD's 132L, 132R respectively. The image corresponding to the operation of the driver is formed in the cabin 14 and in the cockpit 16 on the basis of the image signals.

In the acoustic processing, the host computer 18 determines the information concerning the state, the position, the direction, and the speed of the objective vehicle (step S22D) on the basis of the scenario and the calculation result of the motion information of the real vehicle determined in the step S21. The information is outputted together with the information concerning the subjective vehicle via LAN 28 to the acoustic controller 24 (steps S23D, S24D). The acoustic controller 24 outputs the sound effect from the speaker 136 in the cockpit 16 by the aid of the acoustic amplifier 135 on the basis of the information. It is noted that the state includes, for example, the number of revolution of the engine, the tire squeal sound, the Klaxon, and the siren.

In this embodiment, the image, which is formed by the CG generator 26, can be appropriately changed in response to the operation of the driver. For example, if the objective vehicle of the simulation performed by the driver is an emergency vehicle, the siren can be sounded by operating the operation switch 98 in the cockpit 16. If the driver operates the operation switch 98 in the normal driving state to sound the siren, the operation signal is inputted from the cockpit interface unit 22 via LAN 28 to the scenario-changing section 167 of the host computer 18. When the scenario-changing section 167 receives the operation signal, it selects a corresponding scenario from the scenario-storing section 164. The selected scenario is transmitted to the CG generator 26, and thus the scenario is changed. In this case, the CG generator 26 forms an image on the basis of the new scenario, for example, on the front screen 66, the left screen 68, and the right screen 70, for example, such that the running of other vehicles around the subjective vehicle is stopped, or other vehicles are escaped to the edge of the road. If the driver sounds the Klaxon, a scenario corresponding thereto is selected. For example, it is possible to form an image in which the objective vehicle running in front of the subjective vehicle is accelerated and moved.

On the other hand, during the period in which the processing is carried out as described above, the following images are displayed on the display 32 arranged in front of the operator as shown in FIG. 21. That is, an image (CG) formed on the front screen 66 in the cabin 14, an image (DRIVER) of the driver photographed by the driver image CCD camera 138, an image (PEDAL) of the operation state of the brake pedal 90 and the accelerator pedal 92 photographed by the foot image CCD camera 140, and an image (STEERING) of the operation state of the steering wheel 80 photographed by the steering image CCD camera 142 are displayed in a state of being synthesized by the image synthesizer 30.

Accordingly, the operator can recognize the training state of the driver on the basis of the displayed images on the display 32. Therefore, for example, when the driver uses the drive simulation apparatus 10 in order to learn the driving technique, the instructor can made appropriate instruction and evaluation from the outside on the basis of the displayed images. When the drive simulation apparatus 10 is used for the purpose of research and development, a plurality of other researchers can make evaluation or the like from the outside on the basis of the displayed images. The images displayed on the display 32 can be stored in a storage medium such as VTR to be utilized to perform verification after the simulation.

When the predetermined training is completed as described above, it is confirmed by the driver whether or not the scenario is changed to continue the training (step S8). If the training is continued, the routine returns to the step S4 to set the training condition again. If the training is not continued, the routine proceeds to the step S9.

In the step S9, if the driver is changed, the routine returns to the step S3 to move the cabin 14 to the platform position.

If the training is not continued, and the driver is not changed, then the cabin 14 is moved to the platform position (step S10) to complete the training based on the use of the drive simulation apparatus 10.

In the drive simulation apparatus 10 according to the embodiment of the present invention, a large number of signals are sent and received among the host computer 18, the motion controller 20, the cockpit interface unit 22, the acoustic controller 24, and the CG generator 26. However, the signals are sent and received via LAN 28. Therefore, the communication line is remarkably simplified. As a result, a large amount of signals can be sent and received, and it is possible to perform the simulation in the state more approximate to that of the real vehicle. Because the apparatus is based on LAN, it is extremely easy to replace and remove the control equipment to be connected. Thus, it is possible to provide the drive simulation apparatus 10 having high flexibility with respect to the change of the arrangement.

Further, the simulation can be stopped in response to the situation of the driver without destroying the data, the program, and the like by using the simulation stop switch 148 or 165 provided for the cockpit 16 and the host computer 18 respectively.

For example, if the driver operates the simulation stop switch 148 provided in the cockpit 16, the signal, which is generated by the simulation stop switch 148, is sent to the host computer 18 via the cockpit interface unit 22. The program to complete the simulation is executed by the host computer 18. The process is changed from the training state in the step S7 (see FIG. 16) to the platform state in the step S10 to stop the simulation. For example, if the operator recognizes any abnormal state of the driver on the display 32, when the simulation stop switch 165 is operated, then the program to complete the simulation is executed in the same manner as described above, and the simulation is stopped.

Even if the drive simulation apparatus 10 undergoes runaway control, the action of the motion base 12 can be directly stopped as well by using the emergency stop switch 166 connected to the motor driver 56.

That is, when the emergency stop switch 166 is operated, the electric power to be supplied to the cylinder-driving motors 44A to 44F and the table-driving motor 52 is cut off by the aid of the motor driver 56. When the electric power for the cylinder-driving motors 44A to 44F is cut off, the unillustrated brake mechanism is turned ON to serve to stop the operation of the rod sections 42 of the cylinders A to F. Therefore, the action of the motion base 12 is stopped by operating the emergency stop switch 166. In this arrangement, for example, even if a situation occurs, in which the simulation software for the host computer 18 undergoes runaway control, or the motion controller 20 undergoes runaway control, then the motion base 12 can be reliably stopped and fixed. The emergency stop switch 166 is also useful, for example, when the motion base 12 is fixed for the purpose of maintenance and development.

What is claimed is:

1. A drive simulation apparatus comprising:
   a cockpit provided with various operation equipments and meters required to drive a vehicle, for accommodating a driver;
   a motion base for supporting said cockpit in a swingable state by the aid of actuators;
   an image display unit for displaying a simulation image;
   a host computer for controlling said various operation equipments, said meters, and said image display unit and calculating a control signal for swinging said motion base in accordance with operation of said driver;
   a cockpit interface arranged in said cockpit, for supplying an operation signal generated by operating said operation equipment by said driver to said host computer, and supplying said control signal to said cockpit; and
   a network circuit for mutually sending and receiving said signal between said cockpit interface and said host computer.

2. The drive simulation apparatus according to claim 1, further comprising:
   a motion controller for driving said actuators and controlling swinging movement of said cockpit on the basis of said control signal; and
   a network circuit for mutually sending and receiving said signal between said motion controller and said host computer.

3. The drive simulation apparatus according to claim 1, further comprising:
   an acoustic controller for controlling acoustic equipments in said cockpit on the basis of said control signal; and
   a network circuit for mutually sending and receiving said signal between said acoustic controller and said host computer.

4. The drive simulation apparatus according to claim 1, further comprising:
   an image-forming means for controlling said image display unit to form a simulation image on the basis of said control signal; and
   a network circuit for mutually sending and receiving said signal between said image-forming means and said host computer.

5. The drive simulation apparatus according to claim 1, wherein said motion base supports said cockpit to be capable of making at least a pitching action, and said host computer makes setting in an initial setting state before starting an action of said cockpit so that a front side of said cockpit is deflected by an offset angle $\theta_n$ toward a side of a maximum angle $\theta_{MAX}$ from a central point between said maximum angle $\theta_{MAX}$ and a minimum angle $\theta_{MIN}$ of a pitch angle.

6. The drive simulation apparatus according to claim 5, wherein an inclination table, which supports said cockpit to be inclined by said offset angle $\theta_n$, is allowed to intervene between said cockpit and said motion base, and said cockpit is maintained in a horizontal state by said inclination table in said initial setting state before starting said action of said cockpit.

7. The drive simulation apparatus according to claim 1, further comprising:
   a steering torque-detecting means for detecting a steering torque generated when a steering wheel as one of said operation equipments is steered;
   a first control signal-generating means for generating a first control signal on the basis of said steering torque;
   a second control signal-generating means for calculating a road surface reaction force corresponding to said operation of said driver and generating a second control signal to obtain a road surface reaction force torque;
   an adding means for adding said first control signal and said second control signal; and
   a steering assist means for assisting steering operation of said steering wheel on the basis of an obtained added value.

8. The drive simulation apparatus according to claim 7, wherein said first control signal-generating means generates said first control signal from said steering torque and a vehicle speed calculated on the basis of said operation signal generated by said operation of said driver.

9. The drive simulation apparatus according to claim 7, wherein said steering assist means is an electric power steering mechanism.

10. The drive simulation apparatus according to claim 1, further comprising:
   a steering control signal-generating means for calculating a steering torque of a steering wheel corresponding to said operation of said driver and a road surface reaction force torque corresponding to said operation, and generating a steering control signal to obtain an added value of said steering torque and said road surface reaction force torque; and
   a steering assist means for assisting steering operation of said steering wheel on the basis of said steering control signal.

11. The drive simulation apparatus according to claim 10, wherein said steering assist means is an electric power steering mechanism.

12. The drive simulation apparatus according to claim 1, wherein said host computer includes:
   a scenario-holding means for holding a plurality of scenarios for said image to be displayed on said image display unit; and
   a scenario-changing means for selecting said scenario in accordance with said operation of said driver and changing said scenario to be displayed on said image display unit.

13. The drive simulation apparatus according to claim 1, wherein said host computer includes a mode-selecting means for selecting a mode in which said motion base is operated and a mode in which said motion base is not operated.

14. The drive simulation apparatus according to claim 1, wherein said motion base includes:
   a plurality of cylinders for supporting said cockpit in a state of being capable of making at least a yawing action; and
   a rotary table arranged between said plurality of cylinders and said cockpit, for supporting said cockpit in a state of being capable of making said yawing action.

15. The drive simulation apparatus according to claim 14, wherein said plurality of cylinders control a high frequency component of said yawing action, and said rotary table controls a low frequency component of said yawing action.

16. The drive simulation apparatus according to claim 14, wherein said rotary table is rotated and driven by an electric motor arranged on said motion base corresponding to a central position of said rotary table.

17. The drive simulation apparatus according to claim 1, wherein:
   said host computer includes a vehicle motion-calculating means for calculating vehicle motion information in conformity with said operation of said driver, calculating a first motion base control signal from said vehicle motion information to drive and control said motion base about a swinging center of a position of a center of gravity of said vehicle, calculating a second motion base control signal to drive and control said motion base about a swinging center of a head position of said driver in said cockpit, and adding said first motion base control signal and said second motion base control signal to generate a motion base control signal; and
   said cockpit is controlled for swinging movement on the basis of said motion base control signal.

18. The drive simulation apparatus according to claim 1, further comprising:
   a motion controller for outputting a command signal to control swinging movement of said cockpit on the basis of said control signal;
   drivers connected to said motion controller, for supplying electric power to said respective actuators in accordance with said command signal from said motion controller; and
   a stop means connected to said drivers, for cutting off said electric power to be supplied to said respective actuators to stop an action of said motion base.

19. The drive simulation apparatus according to claim 1, wherein said image display unit includes:
   a front image display means for displaying a front simulation image in front of said driver; and
   a rear image display means for displaying a rear simulation image at the back of said driver.

20. The drive simulation apparatus according to claim 19, wherein said rear image display means is a back mirror display arranged in said cockpit.

21. The drive simulation apparatus according to claim 19, wherein said front image display means is a projector for forming a stereoscopic image.

22. The drive simulation apparatus according to claim 1, wherein said cockpit is provided with a simulation stop switch capable of being operated by said driver.

23. The drive simulation apparatus according to claim 1, wherein said host computer is provided with a simulation stop switch capable of being operated by said driver.

24. A drive simulation apparatus comprising:
   a cockpit provided with various operation equipments and meters required to drive a vehicle, for accommodating a driver;
   a motion base for supporting said cockpit in a swingable state by the aid of actuators;
   an image display unit for displaying a simulation image;
   a host computer for controlling said various operation equipments, said meters, and said image display unit and calculating a control signal for swinging said motion base in accordance with operation of said driver;
   an image-forming means for controlling said image display unit on the basis of said control signal to form said simulation image;
   a photographing means for photographing the inside of said cockpit; and
   an image-synthesizing display means for synthesizing and displaying said image formed by said image-forming means and an image photographed by said photographing means.

25. The drive simulation apparatus of claim 24, wherein said photographing means includes a driver image camera for photographing said driver, a foot image camera for photographing foot surroundings of said driver, and a steering image camera for photographing a steering wheel.

26. A drive simulation apparatus comprising:
   a cockpit provided with various operation equipments and meters required to drive a vehicle, for accommodating a driver;
   a motion base for supporting said cockpit in a swingable state by the aid of actuators;
   an image display unit for displaying a simulation image;

a host computer for controlling said various operation equipments, said meters, and said image display unit and calculating a control signal for swinging said motion base in accordance with operation of said driver;

an AC-DC converter for converting an alternating current supplied from an external power source into a direct current;

a battery connected in parallel to said AC-DC converter; and a relay circuit for connecting said battery to said AC-DC converter in response to ON operation of a start switch of said drive simulation apparatus;

wherein an electric equipment system concerning said operation equipments and said meters is operated by said direct current supplied from said AC-DC converter and said battery.

27. A drive simulation apparatus comprising:

a cockpit provided with various operation equipments and meters required to drive a vehicle, for accommodating a driver;

a motion base for supporting said cockpit in a swingable state by the aid of actuators;

an image display unit for displaying a simulation image;

a host computer for controlling said various operation equipments, said meters, and said image display unit and calculating a control signal for swinging said motion base in accordance with operation of said driver;

a steering torque-detecting means for detecting a steering torque generated when a steering wheel as one of said operation equipments is steered;

a first control signal-generating means for generating a first control signal on the basis of said steering torque;

a second control signal-generating means for calculating a road surface reaction force corresponding to said operation of said driver and generating a second control signal to obtain a road surface reaction torque;

an adding means for adding said first control signal and said second control signal; and a steering assist means for assisting steering operation of said steering wheel on the basis of an obtained added value;

wherein a selector switch, which is capable of switching supply and cutoff of said added value with respect to said steering assist means, is provided between said steering assist means and said first control signal-generating means and said second control signal-generating means.

28. A drive simulation apparatus comprising:

a cockpit provided with various operation equipments and meters required to drive a vehicle, for accommodating a driver;

a motion base for supporting said cockpit in a swingable state by the aid of actuators;

an image display unit for displaying a simulation image;

a host computer for controlling said various operation equipments, said meters, and said image display unit and calculating a control signal for swinging said motion base in accordance with operation of said driver;

a steering control signal-generating means for calculating a steering torque of a steering wheel corresponding to said operation of said driver and a road surface reaction force torque corresponding to said operation, and generating a steering control signal to obtain an added value of said steering torque and said road surface reaction force torque; and a steering assist means for assisting steering operation of said steering wheel on the basis of said steering control signal;

wherein a selector switch, which is capable of switching supply and cutoff of said steering control signal with respect to said steering assist means, is provided between said steering control signal-generating means and said steering assist means.

\* \* \* \* \*